(12) United States Patent
Hecht et al.

(10) Patent No.: US 12,473,340 B2
(45) Date of Patent: Nov. 18, 2025

(54) FUSION TAGS FOR RECOMBINANT PROTEIN EXPRESSION

(71) Applicant: The Trustees of Princeton University, Princeton, NJ (US)

(72) Inventors: Michael Hecht, Princeton, NJ (US); Shlomo Zarzhitsky, South Brunswick, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 918 days.

(21) Appl. No.: 16/633,991

(22) PCT Filed: Jul. 27, 2018

(86) PCT No.: PCT/US2018/044156
§ 371 (c)(1),
(2) Date: Jan. 24, 2020

(87) PCT Pub. No.: WO2019/023616
PCT Pub. Date: Jan. 31, 2019

(65) Prior Publication Data
US 2020/0216512 A1  Jul. 9, 2020

Related U.S. Application Data

(60) Provisional application No. 62/538,505, filed on Jul. 28, 2017.

(51) Int. Cl.
C07K 14/62 (2006.01)
C12P 21/02 (2006.01)

(52) U.S. Cl.
CPC .............. *C07K 14/62* (2013.01); *C12P 21/02* (2013.01); *C07K 2319/00* (2013.01)

(58) Field of Classification Search
None
See application file for complete search history.

(56) References Cited

U.S. PATENT DOCUMENTS

| 2015/0118710 A1 | 4/2015 | Govindappa et al. |
| 2018/0194827 A1 | 7/2018 | DiMarchi et al. |

FOREIGN PATENT DOCUMENTS

| CN | 103031328 A | 4/2013 | |
| WO | WO 2008/062010 A2 | 5/2008 | |
| WO | WO 2015/015518 A2 | 2/2015 | |
| WO | WO2017066441 A1 * | 4/2017 | ............. C12N 15/62 |
| WO | WO 2019/023616 A1 | 1/2019 | |

OTHER PUBLICATIONS

Chica et al. (Curr Opin Biotechnol. Aug. 2005; 16(4):378-84) (Year: 2005).*
Digianantonio et al (A protein constructed de novo enables cell growth by altering gene regulation 2400-2405|PNAS, Mar. 1, 2016, vol. 113, No. 9) (Year: 2016).*
Protein NCBI Database:Accession No. 1P68, 2003.*
Costa, S et al. (Frontiers in Microbiology, 2014, vol. 5, pp. 1-20).*
Kamtekar, S. et al., "Protein Design by Binary Patterning of Polar and Nonpolar Amino Acids," Science, vol. 262; 1680-1985 (1993).
Kobayashi, N. and Arai, R., "Design and construction of self-assembling supramolecular protein complexes using artificial and fusion proteins as nanoscale building blocks," Current Opinion in Biotechnology, vol. 46; 57-65 (2017).
Malik, A., "Protein fusion tags for efficient expression and purification of recombinant proteins in the periplasmic space of *E. coli*," 3 Biotech, vol. 6; No. 44; 7 pages (2016).
Wei. Y. et al., "Stably folded de novo proteins from a designed combinatorial library," Protein Science, vol. 12; 92-102 (2003).
Wei, Y. and Hecht, M.H., et al., "Enzyme-like proteins from an unselected library of designed amino acid sequences," Protein Engineering, vol. 17; No. 1; 67-75 (2004).
Notification of Transmittal of the International Search Report and Written Opinion for International Application No. PCT/US2018/044156, entitled: "Fusion Tags For Recombinant Protein Expression," dated Oct. 8, 2018.
Altschul, S.F. et al., "Basic Local Alignment Search Tool," J. Mol. Biol., vol. 215; 403-410 (1990).
Costa, S.J.M., "Development of a Novel Fusion System for Recombinant Protein Production and Purification in *Escherichia coli*," University of Minho; Doctoral Thesis; 239 Pages (2013).
Das, A. et al., "Combinatorially designed de novo Proteins: Immobilization on gold and applications as Biosensors," Abstracts of Papers, 228th ACS National Meeting, BIOL-222; Philadelphia, PA, United States, Aug. 22-26, 2004; Abstract Only (3 pages).
Das, A. et al., "De novo Designed Heme Binding Proteins Immobilized on Gold Surface: Electrochemical Studies and Biosensor Applications," Abstracts of Papers, 228th ACS National Meeting, INOR-421; Philadelphia, PA, United States, Aug. 22-26, 2004; Abstract Only (4 pages).
Das, A. et al., "Electrochemical and ligand binding studies of a de novo heme protein," Biophysical Chemistry, vol. 123; 102-112 (2006).
Henikoff, S. and Henikoff, J.G., "Amino acid substitution matrices from protein blocks," PNAS, vol. 89; 10915-10919 (1992).
Mathieu, C. et al., "Insulin analogues in type 1 diabetes mellitus: getting better all the time," Nature Reviews, vol. 13; 385-399 (2017).

(Continued)

*Primary Examiner* — Hope A Robinson
(74) *Attorney, Agent, or Firm* — Hamilton, Brook, Smith & Reynolds, P.C.

(57) ABSTRACT

The present invention relates, in certain embodiments, to a fusion protein comprising a DEEP fusion tag and a target protein (e.g., protein of interest). In various other embodiments, the invention provides methods of producing a fusion protein comprising a DEEP fusion tag and a target protein, constructs comprising a nucleotide sequence encoding a DEEP fusion tag and a cloning site for introducing a nucleotide sequence encoding a target protein, and kits comprising such DNA constructs.

5 Claims, 14 Drawing Sheets

Specification includes a Sequence Listing.

(56) References Cited

OTHER PUBLICATIONS

Needleman, S B. and Wunsch, C.D., "A General Method Applicable to the Search for Similarities in the Amino Acid Sequence of Two Proteins," J. Mol. Biol., vol. 48, 443-453 (1970).
Pearson, W.R. and Lipman, D.J., "Improved tools for biological sequence comparison," PNAS, vol. 85; 2444-2448 (1988).
Shinshu University Institutional Repository, Self-assembling nanostructures created from protein nanobuilding blocks using the intermolecular folding structure of a dimeric de novo protein, [online], Apr. 25, 2017, Retrieved from the Internet, [retrieved 15 on Jun. 3, 2022]; 140 pages.
Smith, T.F. and Waterman, M.S., "Comparison of Biosequences," Advances in Applied Mathematics, vol. 2; 482-489 (1981).
Zaykov, A.N. et al., "Pursuit of a Perfect Insulin," Nature Reviews Drug Discovery, vol. 15; Issue 6; 33 pages (2016).
Bradley, L.H. et al., "An intein-based genetic selection allows the construction of a high-quality library of binary patterned de novo protein sequences," Protein Engineering, Design & Selection, vol. 18; No. 4; 201-207 (2005).
Cherny, I. et al., "Proteins from an unevolved library of de novo designed sequences bind a range of small molecules," ACS Synth Biol., vol. 1; No. 4; 130-138 (2012).
Das, A. et al., "Binding of small molecules to cavity forming mutants of a de novo designed protein," Protein Science, vol. 20; 702-711 (2011).
Das, A. and Hecht, M., "Electrochemical and functional studies of de novo alpha helical proteins from a designed combinatorial library," Dissertation Abstracts International, vol. 66; No. 8B; Order No. AAI3188622; 200 pages (2005).
Go, A. et al., "Structure and Dynamics of de novo Proteins from a Designed Superfamily of 4-Helix Bundles," Protein Science, vol. 17; 821-832 (2008).
Hecht, M.H. et al., "De Novo Proteins from Designed Combinatorial Libraries," Protein Science, vol. 13; 1711-1723 (2004).
Kimple, M.E., "Overview of Affinity Tags for Protein Purification," Curr Protoc Protein Sci, vol. 73; Unit-9.9, 26 pages (2015).
Logan, M. et al., "pH Responsive Microdomain Formation in a De Novo Polypeptide," Biopoly, vol. 41; 521-532 (1997).
Palmer. C.A., "Lineage-Specific Differences in Evolutionary Mode in a Salamander Courtship Pheromone," Mol. Biol. Evol., vol. 22; No. 11; 2243-2256 (2005).
Sreenivas, S. et al., "Enhancement in production of recombinant two-chain Insulin Glargine by over-expression of Kex2 protease in Pichia pastoris," Appl Microbial Biotechnol, vol. 99; 327-336 (2015).
Wei, Y. et al., "Letter to the Editor: 1H, 13C, and 15N resonance assignments of S-824, a de novo four-helix bundle from a designed combinatorial library," Journal of Biomolecular NMR, vol. 27; No. 4; 395-396 (2003).
Wei, Y. et al., "Solution structure of a de novo protein from a designed combinatorial library," PNAS, vol. 100; No. 23; 13270-13273 (2003).
Wei, Y., "Structural and functional studies of well-folded alpha helical proteins from a designed combinatorial library," Princeton University; Dissertation Abstracts International, vol. 64; No. 9B; 24 pages (2003).
Zarzhitsky, S. et al., "Harnessing synthetic biology to enhance heterologous protein expression," Protein Science, vol. 29; No. 8; 1698-1706 (2020).
Notification Concerning Transmittal of International Preliminary Report on Patentability for International Application No. PCT/US2018/044156, entitled: "Fusion Tags for Recombinant Protein Expression," dated Feb. 6, 2020.
Raran-Kurussi, S., et al., "The Ability to Enhance the Solubility of Its Fusion Partners Is an Intrinsic Property of Maltose-Binding Protein but Their Folding Is Either Spontaneous or Chaperone-Mediated", Plos One, 2012.

\* cited by examiner

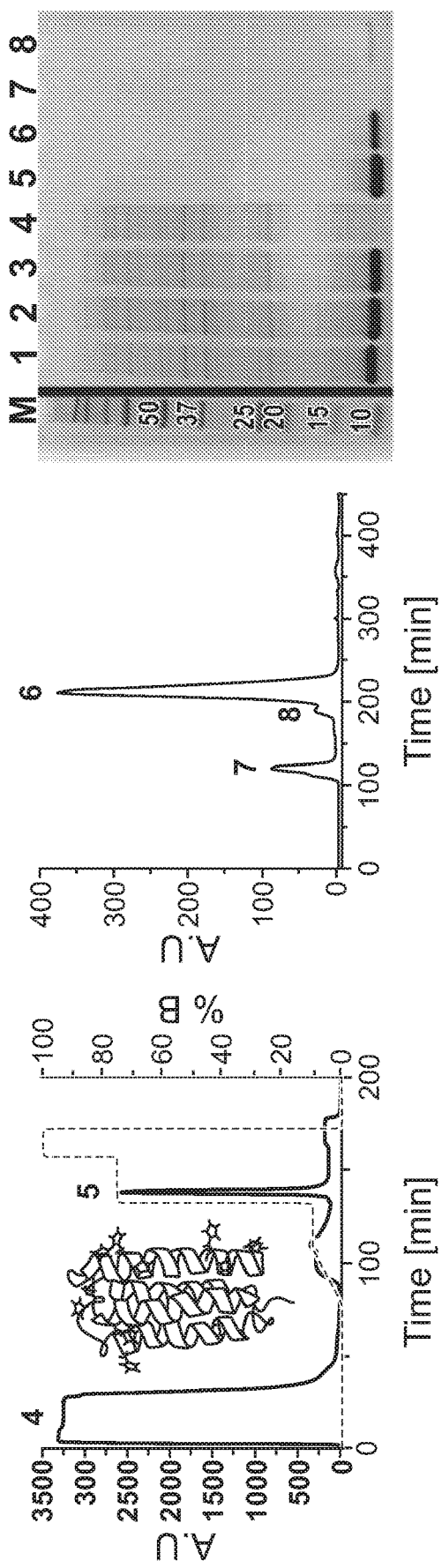

GGGGGGSR

MNLYIQWLKDGGPSSGRPPPS (SEQ ID NO: 4)

GGGGGSR
IEGRDAEFRHDSGYEVHHQK
LVFFAEDVGSNKGAIIGLMV
GGVVIA (SEQ ID NO: 5)

GGGGGGSR
MLSILLSILLSILLSILLSILLSILLSILLSI (SEQ ID NO: 6)

MKFVNQHLCGSHLVEALYLVCGERGFFYTPKT*RR*YGKLNDL
LEDLQEVLKNLHKNWHGGKDNLHDVDNHLQNVIEDIHDFM
QGGGSGGKLQEMMKEFQQVLDELNNHLQGGKHTVHHIEQN
IKEIFHHLEELVHR*KR*GIVEQCCTSICSLYQLENYCN (SEQ ID NO: 7)

FUSION TAGS FOR RECOMBINANT PROTEIN EXPRESSION

RELATED APPLICATION

This application is the U.S. National Stage of International Application No. PCT/US2018/044156, filed on Jul. 27, 2018, published in English, which claims the benefit of U.S. Provisional Application No. 62/538,505, filed on Jul. 28, 2017. The entire teachings of the above applications are incorporated herein by reference.

INCORPORATION BY REFERENCE OF MATERIAL IN ASCII TEXT FILE

This application incorporates by reference the Sequence Listing contained in the following ASCII text file being submitted concurrently herewith:

File Name: 53911006002_Sequence_Listing.txt; Created Jan. 23, 2024, 13,091 bytes in size.

BACKGROUND

The current era of biotechnology began with the creation of recombinant DNA and manipulation of genes across species. Today, this technology is implemented extensively in a broad variety of settings, from basic science to large scale production of protein pharmaceuticals. While manipulating recombinant DNA and inserting it into a variety of different host organisms has become relatively straightforward, the expression and purification of the proteins encoded by this DNA remains challenging. The most commonly used host for expressing recombinant proteins is *Escherichia coli*. Production of proteins in *E. coli* is relatively rapid, inexpensive, user-friendly, and can be directed to different cellular compartments such as the cytoplasm or periplasm, or even secreted extracellularly. However, the expression yield and the solubility of many desirable proteins and peptides are unpredictable and often result in low, or even no expression, in *E. coli* and/or other expression hosts.

Attempts to address these issues have typically involved constructing fusions of the protein of interest (POI) to another protein known as a fusion tag, which in many cases can improve expression levels, enhance solubility, decrease degradation, and facilitate folding of the POI. To date, fusion tags used in protein expression have generally been naturally occurring sequences from particular proteins that express at high levels in host cells. However, there is no known single fusion tag that reliably facilitates the production of all POIs. Consequently, a number of different fusion tags are typically tested for each new POI to determine which, if any, facilitate expression of the POI. Currently, there are only about a dozen naturally occurring fusion tags that have been well-characterized and are available commercially. However, these commercially available fusion tags do not facilitate expression of all POIs, as some POIs remain difficult to produce even when expressed as a fusion with existing tags. Thus, there is a need for new fusion tags that can improve the expression and purification of POIs in general, including POIs that are difficult to produce using existing tags.

SUMMARY

The present invention generally relates to fusion proteins comprising artificial fusion tags, referred to herein as De novo Expression Enhancer Protein (DEEP) fusion tags, that can enhance expression of a wide variety of proteins, as well as DNA constructs encoding such fusion proteins, and methods of obtaining (e.g., producing) such fusion proteins.

Accordingly, in an embodiment, the invention relates to a fusion protein comprising a DEEP fusion tag and a target protein (e.g., protein of interest (POI)).

In another embodiment, the invention relates to a fusion protein comprising a DEEP fusion tag, an insulin A chain polypeptide (e.g., C-terminal to the DEEP fusion tag) and an insulin B chain polypeptide (e.g., N-terminal to the DEEP fusion tag).

In another embodiment, the invention relates to a nucleic acid molecule encoding a fusion protein comprising a DEEP fusion tag (e.g., comprising the amino acid sequence of SEQ ID NO: 1) and a target protein (e.g., POI). In yet another embodiment, the invention relates to a host cell (e.g., *E. coli*) comprising a nucleic acid molecule encoding a fusion protein comprising a DEEP fusion tag (e.g., comprising the amino acid sequence of SEQ ID NO: 1) and a target protein.

In another embodiment, the invention relates to a method of obtaining a target protein, comprising the steps of a) introducing a DNA construct encoding a fusion protein into host cells, wherein the fusion protein comprises a DEEP fusion tag and a target protein, b) expressing the fusion protein in the host cells, c) isolating the fusion protein, and d) cleaving the fusion protein to separate the DEEP fusion tag from the target protein.

In yet another embodiment, the invention relates to a construct comprising i) a nucleotide sequence encoding a DEEP fusion tag, and ii) a cloning site for introducing a nucleotide sequence encoding a target protein.

In an additional embodiment, the invention relates to a kit comprising one or a plurality of DNA constructs, wherein each DNA construct comprises a nucleotide sequence encoding a DEEP protein and a cloning site for introducing a nucleotide sequence encoding a target protein.

As described herein, DEEP fusion tags can facilitate the expression and production of a variety of different proteins in host cells, particularly in *E. coli*, including proteins that are difficult to express using existing fusion tags based on naturally occurring sequences. In addition, fusion proteins comprising DEEP fusion tags are generally soluble and stable over a broad range of pH values (e.g., pH of 4-10), while commercially available fusion tags based on natural sequences are typically stable only around physiological pH. Furthermore, the DEEP fusion tags described herein can also be used as affinity tags for rapid purification of fusion proteins, without the need for an additional affinity tag.

BRIEF DESCRIPTION OF THE DRAWINGS

FIGS. 1A-1E relate to overexpression and purification of DEEP. FIG. 1A) IMAC purification of DEEP proteins (inset: the structure of DEEP protein with highlighted surface exposed 12 His residues, dark hydrophilic and light hydrophobic residues). FIG. 1B) SEC purification of IMAC peak #5 and the corresponding FIG. 1C) SDS-PAGE analysis (1-whole cells, 2-lysed cells, 3-soluble fraction of lysed cells, 4/5/6/7/8-IMAC and SEC peaks). FIG. 1D) RP HPLC analysis of SEC purified DEEP using analytical C8 column with a linear gradient from 20 to 60% B (A-water, B-MeCN, both supplemented with 0.1% v/v of TFA), and FIG. 1E) the corresponding ESI-TOF MS analysis of the peak.

FIG. 2A) Plasmid design and the corresponding sequences of linker residues and frGFP. FIG. 2B) SDS-PAGE of overexpressed and purified frGFP N-terminal fusion to 1-6×His, 2-DEEP and 3-6×His-SUMO. Sol-Soluble fraction of lysed cells, HisTrap-IMAC (immobilized metal affinity chromatography) and SEC-Size exclusion chromatography. FIG. 2C) Fluorescence emission (Ex.: 490 nm) of DEEP-GFP and SUMO-GFP.

FIG. 3A) Plasmid design and the corresponding sequences of linker residues and Trp cage. FIG. 3B) Trp cage was overexpressed without (left gel) and with (middle gel) DEEP and SUMO fusion tags containing the following cleavage sites: 1-DEEP-Met-Trp, 2-DEEP-TEV-Trp, 3-SUMO-Met-Trp and 4-SUMO-TEV-Trp. DEEP-Met-Trp was further purified (right gel) using IMAC. The expected MWs are: 1-14796, 2-15460, 3-16314 and 4-16948 Da. FIG. 3C) Expression comparison of IMAC purified soluble and insoluble fractions and the corresponding FIG. 3D) HPLC analysis.

FIG. 4A) Plasmid design and the corresponding sequences of linker residues and $A\beta_{1-42}$. FIG. 4B) Whole cells SDS-PAGE analysis of 1-$A\beta_{1-42}$, 2-DEEP-$A\beta_{1-42}$ and 3-SUMO-$A\beta_{1-42}$ overexpression (left gel). Purification of DEEP-$A\beta_{1-42}$ from cells induced at 37° C. and 18° C. (right gel). WC-whole cells, Sol-Soluble fraction of lysed cells, Pel-Insoluble protein fraction dissolved in 0.5% w/v sarkosyl. The expected MWs are: 1-4645, 2-17465 and 3-18927 Da. FIG. 4C) SDS-PAGE of the purification process.

FIG. 5A) Plasmid design and the corresponding sequences of linker residues and LS3. FIG. 5B) In order to increase protein yields, the addition of glucose was examined (± indicates overexpression in LB media supplemented with 1% w/v glucose). DEEP-Met-LS3 purification was performed using Ni-NTA beads with buffers as described in the experimental section. The expected MW of DEEP-Met-LS3 is 14865 Da. FIG. 5C) SDS-PAGE of the purification process. The gel on the right is a summary of three expression and purification experiments with SUMO-LS3 and DEEP-LS3.

FIG. 6A) Plasmid design and the corresponding sequence. FIG. 6B) SDS-PAGE of the expression and purification process. WC-Whole cells, Sup1/2/3-supernatants of wash steps and IBs-resuspended inclusion bodies. The expected MW of DEEP-Ins is 18302 Da. FIG. 6C) RP-HPLC chromatogram of the refolding intermediates and the refolding yields as a function of βME. FIG. 6D) LC-MS analysis of V8 protease. Triangles are the cleavage sites of V8 (cleaves at the C-terminus of glutamate).

DETAILED DESCRIPTION

Figure 1E:
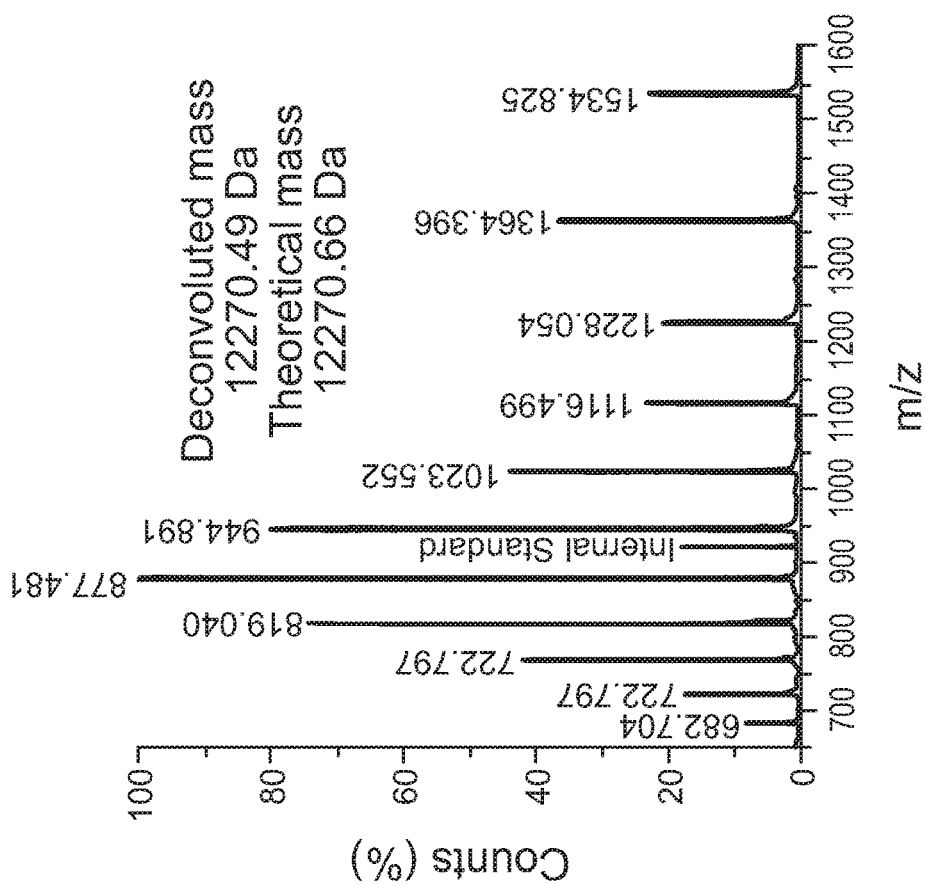

A description of example embodiments follows.

The present invention is based, in part, on the discovery of proteins that, when incorporated into fusion proteins as fusion tags, can facilitate the expression, production and/or purification of a variety of different proteins of interest in and/or from host cells, particularly *E. coli*.

Accordingly, in an embodiment, the invention relates to a fusion protein comprising a DEEP fusion tag and a target protein (e.g., protein of interest).

"Protein," "peptide" and "polypeptide" are used interchangeably herein to denote a polymer of at least two amino acids covalently linked by an amide bond, regardless of length or post-translational modification (e.g., glycosylation or phosphorylation). A protein, peptide or polypeptide can comprise any suitable L- and/or D-amino acid, for example, common α-amino acids (e.g., alanine, glycine, valine), non-α-amino acids (e.g., β-alanine, 4-aminobutyric acid, 6-aminocaproic acid, sarcosine, statine), and unusual amino acids (e.g., citrulline, homocitruline, homoserine, norleucine, norvaline, ornithine). The amino, carboxyl and/or other functional groups on a peptide can be free (e.g., unmodified) or protected with a suitable protecting group. Suitable protecting groups for amino and carboxyl groups, and methods for adding or removing protecting groups are known in the art and are disclosed in, for example, Green and Wuts, "*Protecting Groups in Organic Synthesis*," John Wiley and Sons, 1991. The functional groups of a protein, peptide or polypeptide can also be derivatized (e.g., alkylated) or labeled (e.g., with a detectable label, such as a fluorogen or a hapten) using methods known in the art. A protein, peptide or polypeptide can comprise one or more modifications (e.g., amino acid linkers, acylation, acetylation, amidation, methylation, terminal modifiers (e.g., cyclizing modifications), N-methyl-α-amino group substitution), if desired. In addition, a protein, peptide or polypeptide can be an analog of a known and/or naturally-occurring peptide, for example, a peptide analog having conservative amino acid residue substitution(s).

The term "fusion protein" refers to a synthetic, semi-synthetic or recombinant single protein molecule that comprises all or a portion of two or more different proteins and/or peptides. The fusion can be an N-terminal fusion (with respect to the DEEP fusion tag), a C-terminal fusion (with respect to the DEEP fusion tag) or an internal fusion (with respect to the DEEP fusion tag and/or the target protein).

As used herein, the term "De novo Expression Enhancer Protein fusion tag" or "DEEP fusion tag" refers to a polypeptide having at least two (e.g., 2, 3, 4, 5 or 6) α-helices, wherein each α-helix comprises a binary patterned sequence of seven amino acid residues, or heptad sequence, defined by [PNPPNNP (SEQ ID NO: 15)]$_n$, where each "P" is independently selected from the polar amino acid residues Lys (K), His (H), Glu (E), Gln (Q), Asp (D), Asn (N), Thr (T) and Ser (S), each "N" is independently selected from the non-polar amino acid residues Phe (F), Leu (L), Ile (I), Met (M), Val (V) and Trp (W), and n is an integer from 2 to 10 (e.g., 2, 3, 4, 5, 6, 7, 8, 9, 10). In particular embodiments of a DEEP fusion tag, n=3.

The heptad sequences in an α-helix containing more than one heptad sequence can be identical (i.e., repeats of the same heptad sequence) or they can be different (i.e., each PNPPNNP (SEQ ID NO: 15) heptad sequence within the same α-helix can have a different amino acid sequence). Furthermore, the amino acid composition of the α-helices in a DEEP fusion tag can vary from helix to helix such that, for example, each of the α-helices in the tag will have a different amino acid sequence.

A DEEP fusion tag can also include additional amino acid residues, for example, N-terminal to the first α-helix and/or C-terminal to the last α-helix in the tag. Typically, a DEEP fusion tag will also include interhelical turns between the α-helices, wherein each interhelical turn includes, for example, 4, 5 or 6 amino acid residues encoded by the degenerate DNA codon VAN (V: A, G, or C; N: A, G, C, or T) (e.g., Gly (G), His (H), Gln (Q), Asn (N), Asp (D), Glu (E) and Lys (K)).

A DEEP fusion tag is generally at least about 70 amino acid residues in length (e.g., 74 amino acid residues). In a particular embodiment, a DEEP fusion tag is at least about 100 amino acid residues in length (e.g., 102 amino acid residues). Typically, a DEEP fusion tag is less than about 500 amino acid residues in length, for example, less than about 450 amino acid residues in length or less than about 420 amino acid residues in length.

In a particular embodiment, a DEEP fusion tag includes a plurality of histidine residues that are exposed at the surface in a properly folded fusion protein. In a further embodiment, each α-helix in a DEEP fusion tag includes at least one (e.g., 1, 2, 3, 4, 5, 6, or more, for example, 12) histidine residue(s).

Particular examples of polypeptides that are suitable for use as DEEP fusion tags in the present invention, as well as methods of designing and making such polypeptides, are described in the following publications, each of which is incorporated by reference herein in its entirety:

Wei Y, Liu T, Sazinsky S L, Moffet D A, Pelczer I, and Hecht M H (2003), Stably folded de novo proteins from a designed combinatorial library. *Protein Science* 12, 92-102 (see, e.g., FIG. 2, proteins designated 86, n86, S-23, S-213, S-285, S-824 and S-836);

Kamtekar S, Schiffer J M, Xiong H, Babik J M & Hecht M H (1993), Protein Design by Binary Patterning of Polar and Non-Polar Amino Acids. Science 262, 1680-1685;

Wei Y, Kim S, Fela D, Baum J, & Hecht M H (2003), Solution Structure of a De Novo Protein From a Designed Combinatorial Library. *Proc. Natl. Acad. Sci.* (*USA*) 100, 13270-13273;

Hecht M H, Das A, Go A, Bradley L H & Wei Y (2004), De Novo Proteins from Designed Combinatorial Libraries. *Protein Science* 17, 1711-1723;

Go A, Kim S, Baum J, & Hecht M H (2008), Structure and Dynamics of De novo Proteins from a Designed Superfamily of 4-Helix Bundles. *Protein Science* 17, 821-832; and Bradley L H, Kleiner R E, Wang A F, Hecht M H & Wood D W (2005), An Intein-Based Genetic Selection Enables Construction of a High-Quality Library of Binary Patterned De Novo Sequences. *Protein Engineering, Design & Selection* (*PEDS*) 18, 201-207.

In a particular embodiment, the DEEP fusion tag comprises, consists essentially of, or consists of (e.g., comprises) the amino acid sequence MYGKLNDLLEDLQEVLKNLHKN-WHGGKDNLHDVDNHLQNVIEDIHDFMQGGGSG GKLQEMMKEFQQVLDELNNHLQGGKHTVHHIEQNI-KEIFHHLEEL VHR (SEQ ID NO:1) of the S-824 protein, or a functional fragment thereof, such as a fragment lacking the N-terminal methionine residue.

In another particular embodiment, the DEEP fusion tag comprises, consists essentially of, or consists of (e.g., comprises) the amino acid sequence YGHLNDLLEDLQEVLHNLHHN-WHGGHDNLHDVDNHLQNVIEDIHDFMQGGGSGG HLQEMMHEFQQVLDELNNHLQGGHHTVHHIEQNI-HEIFHHLEELVHR (SEQ ID NO: 10), or a functional fragment thereof.

In other embodiments, the DEEP fusion tag comprises a variant amino acid sequence of the S-824 sequence of SEQ ID NO:1 or SEQ ID NO: 10 having, for example, at least about 70%, 75%, 80%, 85%, 86%, 87%, 88%, 89%, 90%, 91%, 92%, 93%, 94%, 95%, 96%, 97%, 98%, 99% or more identity to the amino acid sequence of SEQ ID NO: 1 or SEQ ID NO: 10, respectively. As used herein, the term "sequence identity" means that two nucleotide or amino acid sequences, when optimally aligned, such as by the programs GAP or BESTFIT using default gap weights, share at least, e.g., 70% sequence identity, or at least 80% sequence identity, or at least 85% sequence identity, or at least 90% sequence identity, or at least 95% sequence identity or more.

For sequence comparison, typically one sequence acts as a reference sequence (e.g., parent sequence) to which test sequences are compared. The sequence identity comparison can be examined throughout the entire length of a given protein, or within a desired fragment of a given protein. When using a sequence comparison algorithm, test and reference sequences are input into a computer, subsequence coordinates are designated, if necessary, and sequence algorithm program parameters are designated. The sequence comparison algorithm then calculates the percent sequence identity for the test sequence(s) relative to the reference sequence, based on the designated program parameters.

Optimal alignment of sequences for comparison can be conducted, e.g., by the local homology algorithm of Smith & Waterman, Adv. Appl. Math. 2:482 (1981), by the homology alignment algorithm of Needleman & Wunsch, J. Mol. Biol. 48:443 (1970), by the search for similarity method of Pearson & Lipman, Proc. Nat'l. Acad. Sci. USA 85:2444 (1988), by computerized implementations of these algorithms (GAP, BESTFIT, FASTA, and TFASTA in the Wisconsin Genetics Software Package, Genetics Computer Group, 575 Science Dr., Madison, Wis.), or by visual inspection (see generally Ausubel et al., Current Protocols in Molecular Biology). One example of algorithm that is suitable for determining percent sequence identity and sequence similarity is the BLAST algorithm, which is described in Altschul et al., J. Mol. Biol. 215:403 (1990). Software for performing BLAST analyses is publicly available through the National Center for Biotechnology Information (publicly accessible through the National Institutes of Health NCBI internet server). Typically, default program parameters can be used to perform the sequence comparison, although customized parameters can also be used. For amino acid sequences, the BLASTP program uses as defaults a wordlength (W) of 3, an expectation (E) of 10, and the BLOSUM62 scoring matrix (see Henikoff & Henikoff, Proc. Natl. Acad. Sci. USA 89:10915 (1989)).

As used herein, the term "target protein" refers to a peptide or polypeptide whose expression in a host system is desired. Such proteins are also referred to herein as proteins of interest, or POIs. Examples of target proteins that can be included in fusion proteins of the invention are green fluorescent protein (GFP), amyloid beta (Aβ) polypeptide, Trp Cage protein, LS3 polypeptide, insulin A chain polypeptide, and insulin B chain polypeptide. A further example of a target protein that can be included in fusion proteins of the invention is insulin, or a fragment thereof, such as an insulin A chain polypeptide, an insulin B chain polypeptide or an insulin C chain polypeptide, or a combination thereof.

In an embodiment, the target protein comprises at least ten amino acids. In one embodiment, the target protein comprises at least twenty amino acids. In another embodiment, the target protein comprises at least thirty amino acids. In a particular embodiment, the target protein comprises at least fifty amino acids. In a certain embodiment, the target protein comprises at least one hundred amino acids.

Generally, a target protein is not a peptide tag or polypeptide domain that is used to promote the expression and/or purification of another, heterologous protein. In an embodiment, the target protein is not a FLAG octapeptide having the amino acid sequence DYKDDDDK (SEQ ID NO: 2). In an embodiment, the target protein is not an elastin-like protein (ELP). In an embodiment, the target protein is not an intein polypeptide. In an embodiment, the target protein is not a tripeptide having the amino acid sequence GGC.

In an embodiment, the DEEP fusion tag is located N-terminal to the target protein. In another embodiment, the DEEP fusion tag is located C-terminal to the target protein.

In some embodiments, the fusion proteins disclosed herein are internal fusions (with respect to the DEEP fusion tag and/or the target protein). For example, the DEEP fusion tag can be inserted into the target protein. Alternatively, the target protein can be inserted into the DEEP fusion tag. In a particular embodiment, the target protein is inserted into an interhelical turn in a DEEP fusion tag.

The fusion proteins of the invention can include other amino acid sequences in addition to the DEEP fusion tag and target protein. In some embodiments, a fusion protein of the invention includes a linker amino acid sequence (e.g., positioned between the DEEP fusion tag and target protein). A variety of linker amino acid sequences are known in the art and can be used in the invention. In some embodiments, a linker sequence includes one or more amino acid residues selected from Gly, Ser, Thr, His, Asp, Glu, Asn, Gln, Lys and Arg. In some embodiments, a linker sequence includes a polyglycine sequence (e.g., a 6× glycine sequence). Other examples of linkers include GSAGSAAGSG (SEQ ID NO: 12), GGGGGGSR (SEQ ID NO: 13), KR and RR. In certain embodiments, a linker sequence includes a cleavage site.

In some embodiments, a fusion protein of the invention includes a cleavage site. A cleavage site is a specific amino acid or amino acid sequence cleaved by a reagent (e.g., a biological reagent, such as a protease, or a chemical reagent).

In an embodiment, the cleavage site is a protease cleavage site (e.g., a site recognized and cleaved by a TEV protease). Nucleotide sequences providing protease cleavage sites for several different proteases are known in the art and include, for example, enteropeptidase cleavage site: DDDDK/(SEQ ID NO: 16); tobacco etch virus protease cleavage site: ENLYFQ/G (SEQ ID NO: 17); factor Xa cleavage site: IEGR/(SEQ ID NO: 18); and thrombin cleavage site: LVPR/GS (SEQ ID NO: 19). Other nucleotide sequences providing protease cleavage sites include, for example, trypsin cleavage at the C-terminal of Lys and Arg; and carboxypeptidase cleavage by hydrolysis of Lys and Arg from the C-terminal position of polypeptides. Thus, a cleavage site in a fusion protein of the invention can be cleaved by an enteropeptidase, a tobacco etch virus protease, a factor Xa, thrombin, trypsin or a carboxypeptidase, for example.

In another embodiment, the cleavage site is a chemical cleavage site (e.g., a site recognized and cleaved by cyanogen bromide (CNBr)). Nucleotide sequences providing chemical cleavage sites for various chemical agents are known in the art and include, for example, CNBr cleavage at the C-terminus of methionine: M/; hydroxylamine cleavage at asparagine-glycine: N/G; and formic acid cleavage at aspartate-proline: D/P.

In some embodiments, the fusion proteins of the invention exhibit stability and/or solubility over a broad pH range. In a particular embodiment, a fusion protein of the invention exhibits stability and/or solubility over a pH range of about 4 to about 10.

Generally, the N- and C-terminal ends of a DEEP fusion tag will be located in close proximity to each other in a properly folded fusion protein of the invention, for example, at a distance that permits intermolecular interactions (e.g., disulfide bond formation) between two peptide chains. According to the nuclear magnetic resonance structure of a representative DEEP fusion tag, S-824 (PDB Entry 1P68), the distance between the N- and C-terminal ends of a properly folded S-824 is in the range of from about 10 angstroms to about 12.4 angstroms. Thus, in some embodiments, the distance between the N- and C-terminal ends of a properly folded DEEP fusion tag is less than about 25 angstroms, for example, less than about 20 angstroms, less than about 15 angstroms or less than about 10 angstroms. In some embodiments, the distance between the N- and C-terminal ends of a properly folded DEEP fusion tag is between from about 1 angstrom to about 25 angstroms, from about 5 angstroms to about 20 angstroms or from about 5 angstroms to about 15 angstroms.

Without wishing to be bound by theory, it is believed that a DEEP fusion tag having such topology can be used to induce multimerization (e.g., dimerization), intermolecular folding and/or disulfide formation between two or more distinct peptide/polypeptide chains or target proteins. Accordingly, in some embodiments, a fusion protein of the invention includes two or more target proteins (e.g., two target proteins). In an embodiment, the DEEP fusion tag is located between two target proteins (e.g., N-terminal to a first target protein and C-terminal to a second target protein). For example, a fusion protein of the invention can include a DEEP fusion tag between a first target protein that is an insulin A chain polypeptide, and a second target protein that is an insulin B chain polypeptide. In this example, the DEEP fusion tag may function like an insulin C chain polypeptide and induce disulfide formation between the A and B chains.

In some embodiments, a fusion protein comprises a DEEP fusion tag, an insulin A chain polypeptide and an insulin B chain polypeptide. In some embodiments, the insulin A chain polypeptide is C-terminal to the DEEP fusion tag. In some embodiments, the insulin B chain polypeptide is N-terminal to the DEEP fusion tag. In some embodiments, the insulin A chain polypeptide is C-terminal to the DEEP fusion tag and the insulin B chain polypeptide is N-terminal to the DEEP fusion tag.

Insulin is transcribed as a 110-amino acid chain, sometimes referred to as preproinsulin. The amino acid sequence of human preproinsulin has been assigned UniProt Accession No. P01308 (SEQ ID NO:11). Removal of the signal peptide of preproinsulin, consisting of amino acid residues 1-24, produces proinsulin. Biologically active insulin results from removal of amino acid residues 57-87 of SEQ ID NO: 11, corresponding to the amino acid sequence of the insulin C chain, and formation of disulfide bonds between the A and B chains. Thus, biologically active insulin comprises just 51 amino acids of the original translation product. Unless otherwise indicated, "insulin," as used herein, encompasses preproinsulin, proinsulin and biologically active insulin. In some embodiments, the insulin is biologically active insulin. In some embodiments, the insulin is proinsulin. In some embodiments, the insulin is preproinsulin.

As used herein, "insulin A chain polypeptide," can be naturally occurring or non-naturally occurring (e.g., engineered). The insulin A chain polypeptide can be recombinant or synthetic, and unmodified or modified (e.g., post-translationally modified, as by glycosylation or phosphorylation, for example). Examples of insulin A chain polypeptides that are suitable for use in the fusion proteins and methods described herein are known in the art and include variants of naturally occurring insulin A chain polypeptides (e.g., variants having at least about 70%, about 75%, about 80%, about 85%, about 90%, about 95%, about 96%, about 97%, about 98% or about 99% identity to a naturally occurring insulin A chain polypeptide), such as an insulin A chain polypeptide from humans. In some embodiments, an insulin A chain polypeptide is a polypeptide having the amino acid sequence of amino acid residues 90-110 of human insulin assigned UniProt Accession No. P01308 (SEQ ID NO:11), or a variant thereof having at least about 70% (e.g., about 75%, about 80%, about 85%, about 90%, about 95%, about 96%, about 97%, about 98% or about 99%) identity to amino acid residues 90-110 of the amino acid sequence of SEQ ID NO:11. The amino acid sequence of SEQ ID NO: 9 corresponds to amino acid residues 90-110 of the amino acid sequence of SEQ ID NO: 11. Accordingly, in some embodiments, an insulin A chain polypeptide is a polypeptide having the amino acid sequence of SEQ ID NO: 9, or a variant thereof having at least about 70% (e.g., about 75%, about 80%, about 85%, about 90%, about 95%, about 96%, about 97%, about 98% or about 99%) identity to the amino acid sequence of SEQ ID NO: 9.

As used herein, "insulin B chain polypeptide," can be naturally occurring or non-naturally occurring (e.g., engineered). The insulin B chain polypeptide can be recombinant or synthetic, and unmodified or modified (e.g., post-translationally modified, as by glycosylation or phosphorylation, for example). Examples of insulin B chain polypeptides that are suitable for use in the fusion proteins and methods described herein are known in the art and include variants of naturally occurring insulin B chain polypeptides (e.g., variants having at least about 70%, about 75%, about 80%, about 85%, about 90, about 95%, about 96%, about 97%, about 98% or about 99% identity to a naturally occurring insulin B chain polypeptide), such as an insulin B chain polypeptide from humans. In some embodiments, an insulin B chain polypeptide is a polypeptide having the amino acid sequence of amino acid residues 25-54 of human insulin assigned UniProt Accession No. P01308 (SEQ ID NO:11), or a variant thereof having at least about 70% (e.g., about 75%, about 80%, about 85%, about 90%, about 95%, about 96%, about 97%, about 98% or about 99%) identity to amino acid residues 25-54 of the amino acid sequence of SEQ ID NO:11. The amino acid sequence of SEQ ID NO: 8 corresponds to amino acid residues 25-54 of the amino acid sequence of SEQ ID NO: 11. Accordingly, in some embodiments, an insulin B chain polypeptide is a polypeptide having the amino acid sequence of SEQ ID NO: 8, or a variant thereof having at least about 70% (e.g., about 75%, about 80%, about 85%, about 90%, about 95%, about 96%, about 97%, about 98% or about 99%) identity to the amino acid sequence of SEQ ID NO: 8.

As used herein, "insulin C chain polypeptide," can be naturally occurring or non-naturally occurring (e.g., engineered). The insulin C chain polypeptide can be recombinant or synthetic, and unmodified or modified (e.g., post-translationally modified, as by glycosylation or phosphorylation, for example). Examples of insulin C chain polypeptides that are suitable for use in the fusion proteins and methods described herein are known in the art and include variants of naturally occurring insulin C chain polypeptides (e.g., variants having at least about 70%, about 75%, about 80%, about 85%, about 90, about 95%, about 96%, about 97%, about 98% or about 99% identity to a naturally occurring insulin C chain polypeptide), such as an insulin C chain polypeptide from humans. In some embodiments, an insulin C chain polypeptide is a polypeptide having the amino acid sequence of amino acid residues 57-87 of human insulin assigned UniProt Accession No. P01308 (SEQ ID NO:11), or a variant thereof having at least about 70% (e.g., about 75%, about 80%, about 85%, about 90%, about 95%, about 96%, about 97%, about 98% or about 99%) identity to amino acid residues 57-87 of the amino acid sequence of SEQ ID NO:11.

U.S. Application Publication No. US 2018/0194827 describes insulin peptides and single chain insulin peptide agonists that include insulin A chains and insulin B chains containing a variety of substitutions, additions and/or modifications compared to native or naturally-occurring insulin A and B chains. The teachings of US 2018/0194827 relevant to insulin derivatives and analogs, for example, insulin A chain polypeptides and insulin B chain polypeptides, are incorporated herein by reference in their entirety. Thus, examples of insulin A chain polypeptides and insulin B chain polypeptides include the insulin A chains and insulin B chains disclosed in US 2018/0194827.

Mathieu, C., Gillard, P. and Benhalima, K., Nature Reviews Endocrinology 13, 385-399 (2017) (Mathieu et al.) and Zaykov, A. N., Mayer, J. P. and DiMarchi, R. D., Nature Reviews Drug Discovery 15, 425-439 (2016) (Zaykov et al.) describe insulin analogues. The teachings of Mathieu et al. and Zaykov et al. relevant to insulin derivatives and analogues, for example, insulin A chain polypeptides and insulin B chain polypeptides, are incorporated herein by reference in their entirety. Thus, examples of insulin A chain polypeptides and insulin B chain polypeptides include the insulin A chains and insulin B chains disclosed in Mathieu et al. and Zaykov et al.

Some embodiments of a DEEP-insulin A chain polypeptide-insulin B chain polypeptide fusion further comprise a first linker between the DEEP fusion tag and the insulin A chain polypeptide. Some embodiments of a DEEP-insulin A chain polypeptide-insulin B chain polypeptide fusion further comprise a second linker between the DEEP fusion tag and the insulin B chain polypeptide. Some embodiments of a DEEP-insulin A chain polypeptide-insulin B chain polypeptide fusion further comprise a first linker between the DEEP fusion tag and the insulin A chain polypeptide and a second linker between the DEEP fusion tag and the insulin B chain polypeptide. In some embodiments, the first linker includes a first cleavage site (e.g., a protease cleavage site, a chemical cleavage site). In some embodiments, the second linker includes a second cleavage site (e.g., a protease cleavage site, a chemical cleavage site).

Some embodiments of a DEEP-insulin A chain polypeptide-insulin B chain polypeptide fusion further comprise a first cleavage site between the DEEP fusion tag and the insulin A chain polypeptide. Some embodiments of a DEEP-insulin A chain polypeptide-insulin B chain polypeptide fusion further comprise a second cleavage site between the DEEP fusion tag and the insulin B chain polypeptide. Some embodiments of a DEEP-insulin A chain polypeptide-insulin B chain polypeptide fusion further comprise a first cleavage site between the DEEP fusion tag and the insulin A chain polypeptide and a second cleavage site between the DEEP fusion tag and the insulin B chain polypeptide.

In some embodiments of a DEEP-insulin A chain polypeptide-insulin B chain polypeptide fusion having a first cleavage site and a second cleavage site, the first cleavage site and the second cleavage site are cleavable under the same conditions (e.g., by the same protease, under the same chemical conditions). In some embodiments, the first cleavage site and the second cleavage site are independently cleavable (e.g., by independent and distinct proteases, under orthogonal chemical conditions).

In one embodiment of a fusion protein of the invention, the fusion protein comprises the amino acid sequence of SEQ ID NO: 7, or a variant thereof having at least about 70% (e.g., about 75%, about 80%, about 85%, about 90%, about 95%, about 96%, about 97%, about 98% or about 99%) identity to the amino acid sequence of SEQ ID NO: 7.

In one embodiment of a fusion protein of the invention, the fusion protein comprises the amino acid sequence: MRFVNQHLCGSHLVEALYLVCGERGFFYTPKTRRYGHLNDLLEDLQEVLHNLHH NWHGGHDNLHDVDNHLQNVIEDIHDFMQGGGSGGHLQEMMHEFQQVLDELN NHLQGGHHTVHHIEQNIHEIFHHLEELVHRKRGIVEQCCTSICSLYQLENYCN (SEQ ID NO: 14), or a variant thereof having at least about 70% (e.g., about 75%, about 80%, about 85%, about 90%, about 95%, about 96%, about 97%, about 98% or about 99%) identity to the amino acid sequence of SEQ ID NO: 14. The portion of SEQ ID NO: 14 in bold text corresponds to a DEEP fusion tag having the amino acid sequence of SEQ ID NO: 10.

In another embodiment, the invention relates to a nucleic acid molecule encoding a fusion protein of the invention. The term "nucleic acid" is used herein to refer to a polymer comprising multiple nucleotide monomers (e.g., ribonucleotide monomers or deoxyribonucleotide monomers). "Nucleic acid" includes, for example, DNA (e.g., cDNA), RNA, and DNA-RNA hybrid molecules. Nucleic acid molecules can be naturally occurring, recombinant, or synthetic. In addition, nucleic acid molecules can be single-stranded, double-stranded or triple-stranded. In some aspects, nucleic acid molecules can be modified. Nucleic acid modifications include, for example, methylation, substitution of one or more of the naturally occurring nucleotides with a nucleotide analog, internucleotide modifications such as uncharged linkages (e.g., methyl phosphonates, phosphotriesters, phosphoamidates, carbamates, and the like), charged linkages (e.g., phosphorothioates, phosphorodithioates, and the like), pendent moieties (e.g., polypeptides), intercalators (e.g., acridine, psoralen, and the like), chelators, alkylators, and modified linkages (e.g., alpha anomeric nucleic acids, and the like). In the case of a double-stranded polymer, "nucleic acid" can refer to either or both strands of the molecule.

Although the genetic code is degenerate in that most amino acids are represented by several codons (called "synonyms" or "synonymous" codons), it is understood in the art that codon usage by particular organisms is nonrandom and biased towards particular codon triplets. Accordingly, in a particular embodiment, a nucleic acid encoding a fusion protein of the invention includes a nucleotide sequence that has been optimized for expression in a particular type of host cell (e.g., through codon optimization). Codon optimization refers to a process in which a polynucleotide encoding a protein of interest is modified to replace particular codons in that polynucleotide with codons that encode the same amino acid(s), but are more commonly used/recognized in the host cell in which the nucleic acid is being expressed. In some aspects, the polynucleotides encoding a fusion protein of the invention are codon optimized for expression in *Escherichia coli*.

In another embodiment, the invention relates to a host cell comprising a nucleic acid molecule encoding a fusion protein of the invention. As used herein, the term "host cell" refers to a suitable host for expressing a nucleic acid encoding a fusion protein comprising a DEEP fusion tag. In some embodiments, the host cells are cells that have been transformed or transfected with vectors constructed using recombinant DNA techniques known in the art. Examples of suitable host cells include yeast cells (e.g., *Pichia pastoris* and *Saccharomyces cerevisiae*), insect cells (e.g., *Spodoptera frugiperda* Sf9 cells), mammalian cells (e.g., CHO cells), and bacterial cells (e.g., *Escherichia coli* and *Bacillus subtilis*; *Agrobacterium tumefaciens*). Further examples of suitable host cells include plant cells (e.g., *Nicotiana benthamiana*). In a particular aspect, the host cell is *Escherichia coli*.

The fusion proteins of the invention can be produced recombinantly or synthetically, using routine methods and reagents that are well known in the art. For example, a fusion protein of the invention can be produced recombinantly in a suitable host cell (e.g., bacteria, yeast, insect cells, mammalian cells) according to methods known in the art. See, e.g., *Current Protocols in Molecular Biology*, Second Edition, Ausubel et al. eds., John Wiley & Sons, 1992; and *Molecular Cloning: a Laboratory Manual*, 2nd edition, Sambrook et al., 1989, Cold Spring Harbor Laboratory Press. For example, a nucleic acid molecule comprising a nucleotide sequence encoding a fusion protein described herein can be introduced and expressed in suitable host cells (e.g., *Escherichia coli*), and the expressed fusion protein can be isolated/purified from the host cells (e.g., in inclusion bodies) using routine methods and readily available reagents.

In certain embodiments, the invention also relates to a method of obtaining (e.g., expressing, producing, purifying) a target protein. In an embodiment, the method comprises the steps of a) introducing a DNA construct encoding a fusion protein into host cells, wherein the fusion protein comprises a DEEP fusion tag and a target protein, b) expressing the fusion protein in the host cells, c) isolating the fusion protein, and d) cleaving the fusion protein to separate the DEEP fusion tag from the target protein.

Methods for introducing DNA constructs encoding fusion proteins into host cells are well known in the art and include, for example, standard transformation and transfection techniques (e.g., electroporation, chemical transformation). A person of ordinary skill in the field of the invention can readily select an appropriate method for introducing a DNA construct into host cells.

A variety of methods for expressing proteins in host cells are well known in the art (e.g., IPTG-induced expression in *Escherichia coli*). A person of ordinary skill in the field of the invention can readily select an appropriate method for expressing a fusion protein of the invention in host cells.

An expressed fusion protein can be isolated from host cells using known methods and reagents including, e.g., lysozyme treatment, sonication, filtration, salting-out, ultracentrifugation, and chromatography. A recombinantly-expressed fusion protein can be recovered from host cells and/or the host cell culture medium. Once released from the cells, the fusion protein can be purified from cell lysates by binding to an affinity resin using standard techniques and reagents. In a particular embodiment, the fusion protein is isolated by binding of the DEEP fusion tag in the fusion protein to an affinity resin (e.g., on a solid support). In some embodiments, the DEEP fusion tag comprises a plurality of surface-exposed histidine residues, enabling purification by methods typically used for His-tagged proteins. For example, a fusion protein of the invention can be isolated using immobilized metal ion affinity chromatography (IMAC). Suitable IMAC resins containing immobilized transition metals for IMAC applications are known in the art and are commercially available (e.g., TALON® Superflow™ resins, HisTrap™ High Performance resins, GE Healthcare Life Sciences), and include, e.g., immobilized nickel resins, immobilized cobalt resins, immobilized copper resins, and immobilized zinc resins. In a particular embodiment, a fusion protein of the invention is purified using an affinity resin comprising immobilized nickel ions.

As used herein, "isolated" means substantially pure. For example, an isolated fusion protein makes up at least about 50%, about 60%, about 70%, about 80%, about 90%, about 95%, about 97%, about 98%, about 99% or about 99.5% by weight of a mixture containing substances (e.g., chemicals, proteins, peptides, other biological matter) other than the fusion protein.

Methods of cleaving fusion tags from fusion protein are known in the art. For example, cleavage of the fusion protein to separate the DEEP fusion tag, from the target protein can be performed by chemical cleavage (e.g., CNBr cleavage) or enzymatic cleavage (e.g., protease cleavage).

In yet another embodiment, the invention relates to a construct comprising a nucleotide sequence encoding a DEEP fusion tag, and a cloning site for introducing a nucleotide sequence encoding a target protein. In a particular embodiment, the construct is a DNA construct. The DEEP fusion tag can be any of the DEEP fusion tags described herein (e.g., SEQ ID NO:1). Examples of target proteins include the target proteins described herein (e.g., SEQ ID NO:1).

In some embodiments, the construct is a plasmid. Generally, the term "plasmid" is used interchangeably with the term "vector", and refers to a nucleic acid construct for introducing a nucleic acid sequence into a cell. In some aspects, the plasmid is an expression plasmid that is operably linked to one or more suitable heterologous sequence(s) capable of effecting the expression in a suitable host, as described herein. "Operably linked" is defined herein as a configuration in which a heterologous sequence is appropriately placed (e.g., in a functional relationship) at a position relative to a polynucleotide of interest such that the heterologous sequence, e.g., directs or regulates the expression of the polynucleotide encoding a polypeptide of interest, or is expressed in-frame relative to the expression product of the polynucleotide of interest. As used herein, an amino acid or nucleotide sequence is "heterologous" to another sequence with which it is operably linked if the two sequences are not associated in nature.

In one aspect, the heterologous sequence is a promoter sequence. As used herein, a "promoter sequence" refers to a nucleic acid sequence that is recognized by one or more proteins that are endogenous to a host cell and which are capable of directing transcription of a nucleic acid operably linked to the promoter in a host cell. Typically, the promoter sequence contains transcriptional control sequences that mediate the expression of a polynucleotide of interest. The promoter may be any nucleic acid sequence which shows transcriptional activity in the host cell of choice including mutant, truncated, and hybrid promoters, and may be obtained from genes encoding extracellular or intracellular polypeptides either homologous or heterologous to the host cell. For bacterial host cells, suitable promoters for directing transcription of the nucleic acid constructs of the present disclosure, include, but are not limited to promoters obtained from the *E. coli* lac operon, *Streptomyces coelicolor* agarase gene (dagA), *Bacillus subtilis* levansucrase gene (sacB), *Bacillus licheniformis* alpha-amylase gene (amyL), *Bacillus stearothermophilus* maltogenic amylase gene (amyM), *Bacillus amyloliquefaciens* alpha-amylase gene (amyQ), *Bacillus licheniformis* penicillinase gene (penP), *Bacillus subtilis* xy1A and xy1B genes, and prokaryotic beta-lactamase gene (See e.g., Villa-Kamaroff et al., *Proc. Natl. Acad. Sci. USA* 75: 3727-3731, 1978), as well as the tac promoter (See e.g., DeBoer et al., *Proc. Natl. Acad. Sci. USA* 80: 21-25, 1983). Examples of promoters for filamentous fungal host cells, include, but are not limited to promoters obtained from the genes for *Aspergillus oryzae* TAKA amylase, *Rhizomucor miehei* aspartic proteinase, *Aspergillus niger* neutral alpha-amylase, *Aspergillus niger* acid stable alpha-amylase, *Aspergillus niger* or *Aspergillus awamori* glucoamylase (glaA), *Rhizomucor miehei* lipase, *Aspergillus oryzae* alkaline protease, *Aspergillus oryzae* triose phosphate isomerase, *Aspergillus nidulans* acetamidase, and *Fusarium oxysporum* trypsin-like protease (See e.g., WO 96/00787), as well as the NA2-tpi promoter (a hybrid of the promoters from the genes for *Aspergillus niger* neutral alpha-amylase and *Aspergillus oryzae* triose phosphate isomerase), and mutant, truncated, and hybrid promoters thereof. Examples of yeast cell promoters can be from the genes for *Saccharomyces cerevisiae* enolase (ENO-1), *Saccharomyces cerevisiae* galactokinase (GAL1), *Saccharomyces cerevisiae* alcohol dehydrogenase/glyceraldehyde-3-phosphate dehydrogenase (ADH2/GAP), and *Saccharomyces cerevisiae* 3-phosphoglycerate kinase. Other useful promoters for yeast host cells are known in the art (see e.g., Romanos et al., Yeast 8:423-488, 1992).

In addition to a promoter sequence, examples of other heterologous sequences that can be operably linked to a nucleotide sequence encoding a DEEP fusion tag and/or POI in a DNA construct of the invention include, but are not limited to, sequences encoding other fusion moieties (e.g., maltose binding protein (MBP), glutathione-S-transferase (GST)), sequences encoding signal peptides, sequences encoding propeptides, initiation sequences, terminator sequences, transcriptional and translational stop signals, and selectable marker sequences.

In addition to a nucleotide sequence encoding a DEEP fusion tag, the constructs described herein include one or more (e.g., 1, 2, or 3) cloning site(s) for introducing a nucleotide sequence(s) (e.g., sequence encoding a target protein). The cloning site can be located upstream or downstream of a nucleotide sequence encoding a target protein. A variety of useful cloning sites for inclusion in a nucleic acid construct of this invention are known to those of skill in the art. In some embodiments, the cloning site is a nucleotide sequence that is recognized and/or cleaved by a restriction enzyme.

In some embodiments, the construct further comprises one or more nucleotide sequences encoding a linker amino acid sequence (e.g., a linker nucleotide sequence located between the nucleotide sequence encoding the DEEP fusion tag and the cloning site). Examples of linker amino acid sequences include any of the linkers described herein (e.g., a polyglycine linker).

In some embodiments, the construct further comprises a selectable marker, such as an antibiotic resistance gene (e.g., a kanamycin resistance gene). A variety of selectable markers are known in the art and can be used in the present invention.

In a further embodiment, the invention relates to a kit comprising one or more DNA constructs of the invention, wherein the one or more constructs each comprise a nucleotide sequence encoding a DEEP protein, and a cloning site for introducing a nucleotide sequence (e.g., a heterologous sequence encoding a target protein/protein of interest). Suitable DNA constructs include, for example, any of the DNA constructs described herein. Suitable cloning sites (e.g., restriction sites) include those described herein. Preferably, the cloning site is located in a position relative to the sequence encoding the DEEP fusion tag that allows for an in-frame insertion of a heterologous nucleotide sequence encoding a target protein.

In an embodiment, the kit comprises a single DNA construct comprising a sequence encoding a DEEP protein, and a cloning site. In another embodiment, the kit comprises a plurality of constructs comprising a nucleotide sequence encoding a DEEP protein, and a cloning site. In a particular embodiment, the kit includes a plurality of DNA constructs, wherein each DNA construct encodes a different DEEP fusion tag. In another embodiment, the kit includes a plurality of DNA constructs, wherein each DNA construct encodes the same DEEP fusion tag.

The plurality of constructs in a kit can include the same cloning site or different cloning sites. In an embodiment, each DNA construct includes the same cloning site. The cloning site can be located upstream or downstream of the nucleotide sequence encoding the DEEP fusion tag in the construct.

Kits of the invention that include a plurality of DNA constructs can be used, for example, in high throughput screening methods designed to identify DEEP fusion proteins having optimal expression in a particular host.

In some embodiments, the kits further comprise one or more additional reagents, such as reagents useful for molecular cloning techniques (e.g., a restriction enzyme).

Typically, the kits are compartmentalized for ease of use and can include one or more containers with reagents. In one embodiment, all of the kit components are packaged together. Alternatively, one or more individual components of the kit can be provided in a separate package from the other kit components.

EXEMPLIFICATION

The following materials and methods were used in the experiments described in FIGS. 1A-6D herein.

Construction of Plasmids and Strains:

Synthetic genes encoding amyloid beta 1-42 ($A\beta_{1-42}$, TRP cage (TRP), insulin (INS) and (LSLLLSL (SEQ ID NO: 20))$_3$ (LS3) were ordered as *Escherichia coli* codon optimized gBlocks (Integrated DNA Technologies), and amplified with forward and reverse primers containing XbaI and HindIII restriction sites. Genes encoding S-824 and SUMO proteins were amplified from previously reported plasmids with forward and reverse primers containing NdeI and XbaI restriction sites (SUMO: J. Am. Chem. Soc. 2016, 138, 2162-2165, S824: Journal of Molecular Biology 428, 399-411). Using standard genetic engineering techniques, digested S-824, the POIs (Protein/Peptide of Interest) and linearized plasmids were ligated to yield pET30DEEP-POI plasmids. For the GFP fusion, S-824 and SUMO were cloned into pET28GFP, using NdeI and BamHI restriction sites as described previously (J. Molec. Biology 319, 1279-1290). The ligated plasmids were transformed into DH5a cells and grown on kanamycin selection plates. For plasmid DNA extraction and sequencing, colonies were inoculated into a test tube containing 5 mL fresh LB supplemented with 30 mg/L kanamycin (LB-kan) and grown overnight in a shaking incubator at 37° C., 200 RPM.

Protein Expression and Lysis:

Sequenced plasmids were transformed into BL21DE3 cells and grown on kanamycin selection LB agar plates. A fresh colony was inoculated into 15 mL of LB-kan in a 50-mL flask for overnight incubation at 37° C., 200 RPM. The next day, 10 mL of overnight grown culture was inoculated into 1 L of LB-kan in a 4-L flask. The expression experiments were conducted by growing the cells at 37° C., 200 RPM to OD$_{600}$ of approximately 0.6. Protein expression was initiated by the addition of IPTG (1 or 0.1 mM) and further incubation at 37° C. for approximately 4 hours or 18° C. overnight, 200 RPM. Cells were harvested by centrifugation at 4° C., 5000×g and stored at −80° C. Cells pellets were resuspended in 50 mM Tris, 300 mM NaCl, and 10% v/v glycerol at pH=8, and lysed using at least three passages through Emulsiflex C3 homogenizer operating at 1000 bar. Lysates were clarified by centrifugation at 4° C., 30000×g for 30 minutes.

Purification of Soluble Proteins:

Both DEEP-GFP and DEEP-TRP were found in the soluble fraction. Supernatants were filtered through 0.45-μm PVDF membrane syringe filter and loaded onto a HisTrap (GE Healthcare) column preequilibrated in buffer A (TBS: 50 mM Tris, 300 mM NaCl at pH=8). The column was washed with 10 column volumes of buffer A. The proteins were then eluted with 75% buffer B (TBS, 500 mM imidazole at pH=8). The eluted fractions were combined to yield approximately 10 mL, and further purified either by size exclusion chromatography (SEC) using HiLoad Superdex 75 26/600 column (GE Healthcare) or by dialysis using 3,500 MWCO tube.

Figure 1D:
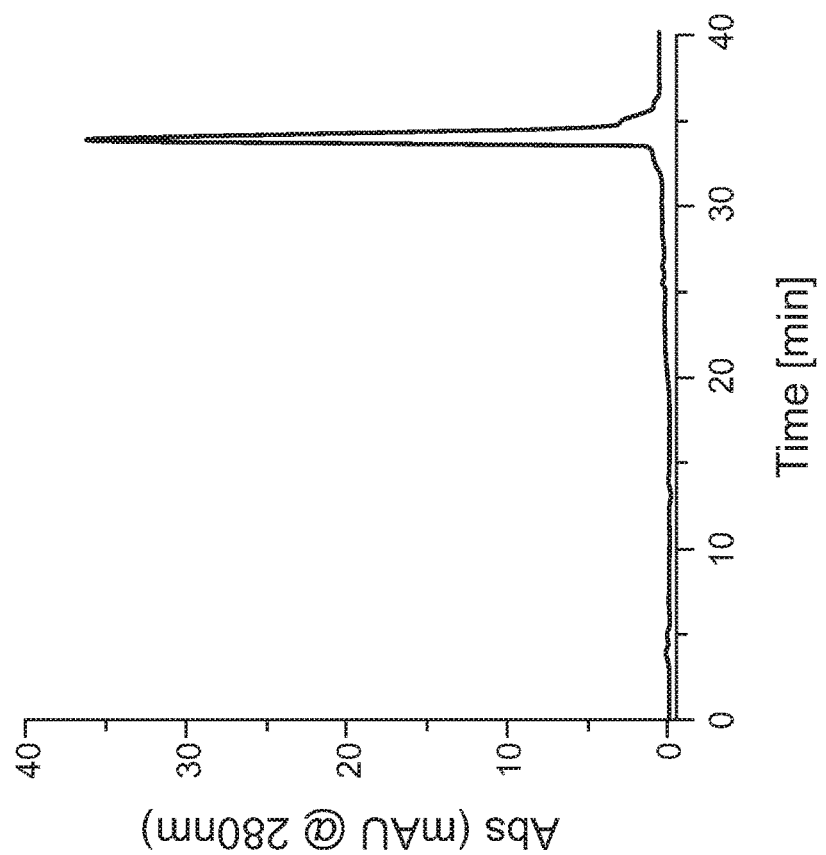

FIGS. 1A-1E relate to overexpression and purification of DEEP, and show that DEEP can serve as a purification handle. Owing to a dozen surface-exposed histidine residues, DEEP binds to Ni-IMAC column with comparable affinity to a His-tag. The protein could be further purified to more than 95% purity, as indicated by the HPLC chromatogram (FIG. 1D).

Figure 2A:
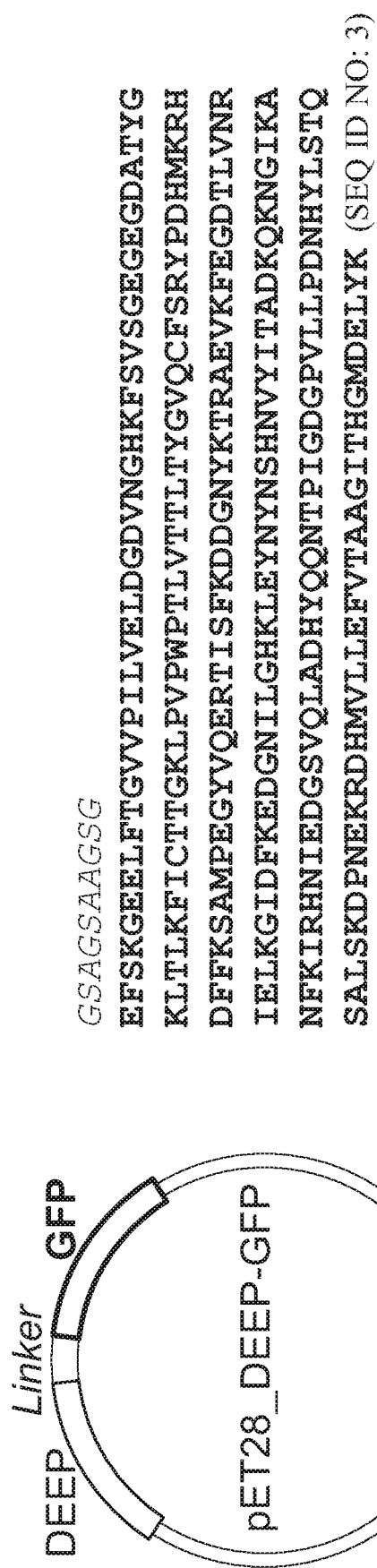
FIGS. 2A-2C relate to overexpression and purification of frGFP (folding reporter GFP).
Figure 2B:
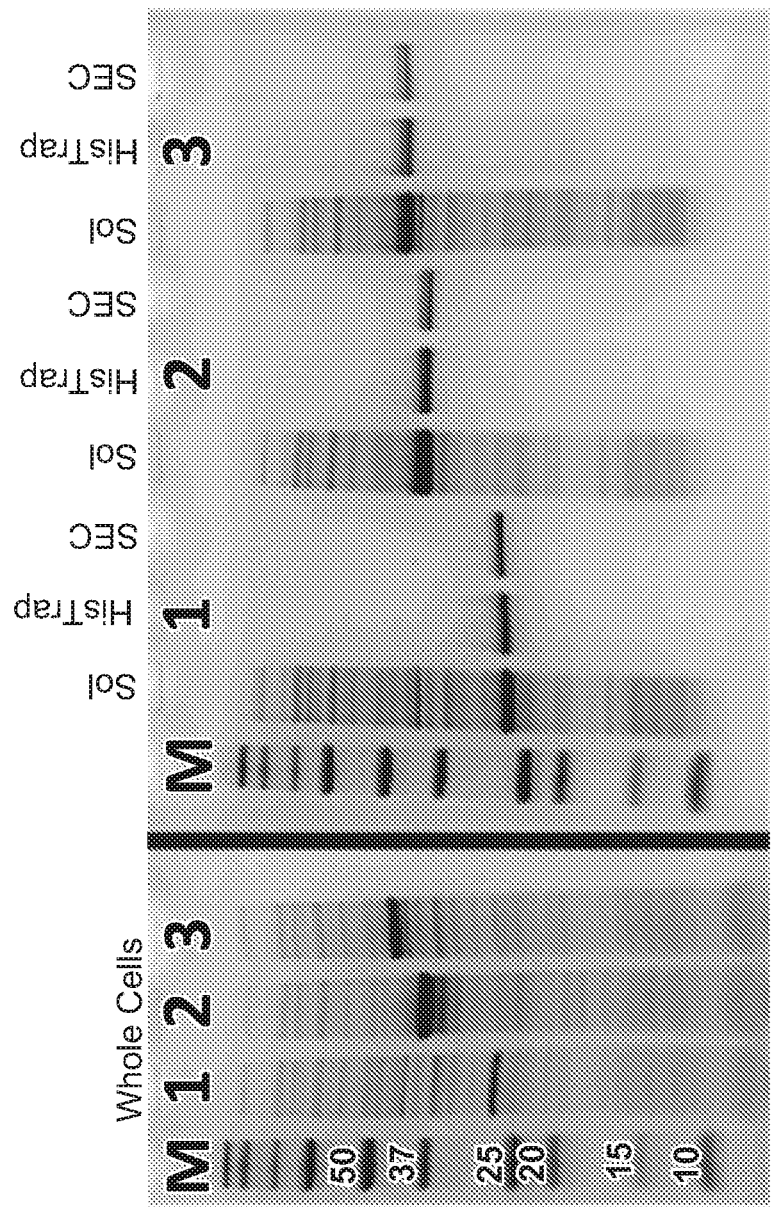
Figure 2C:
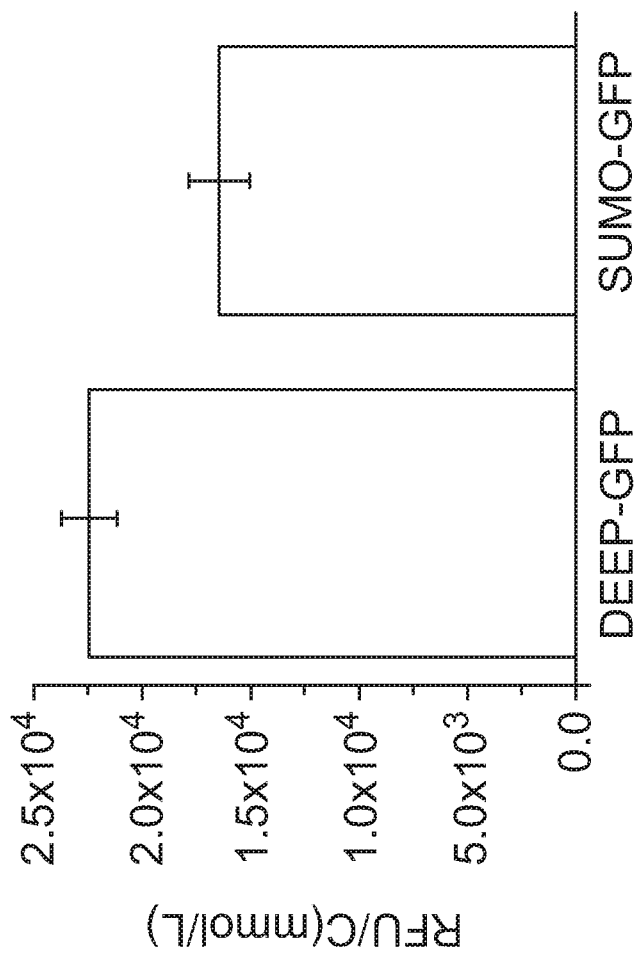
Figure 3B:
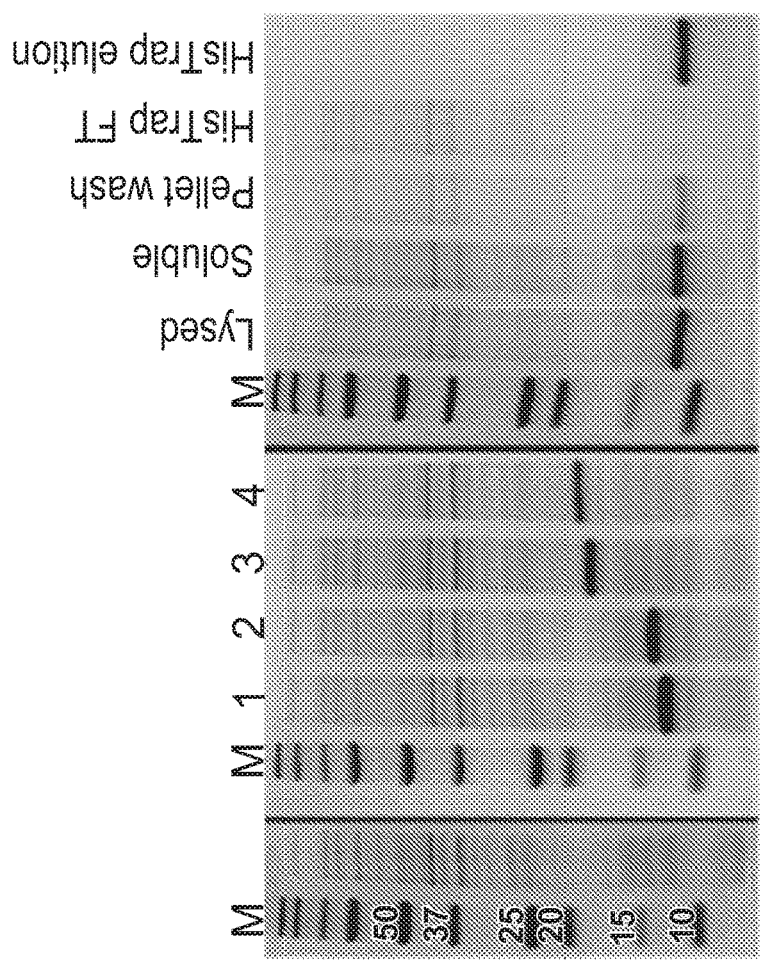
FIGS. 3A-3D relate to overexpression and purification of Trp cage.
Figure 3A:
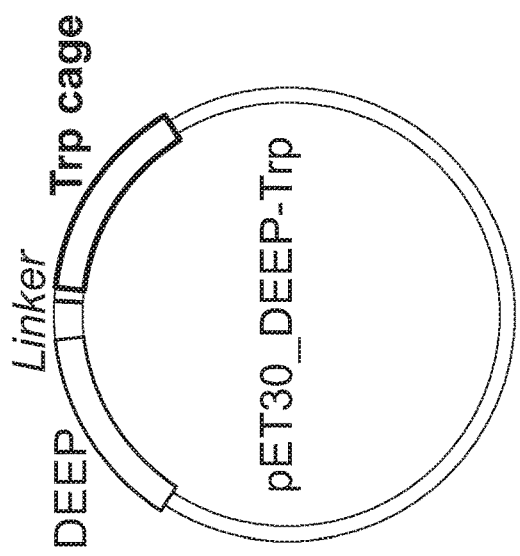
Figure 3C:
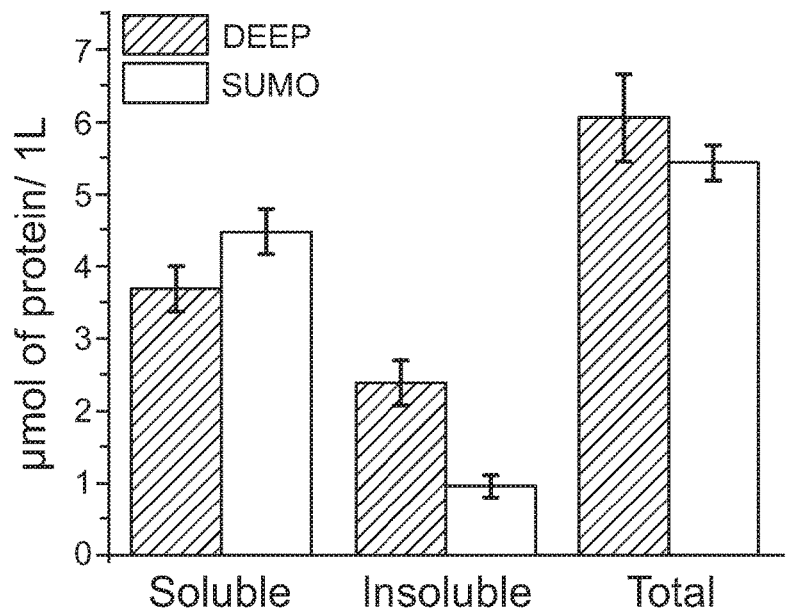
Figure 3D:
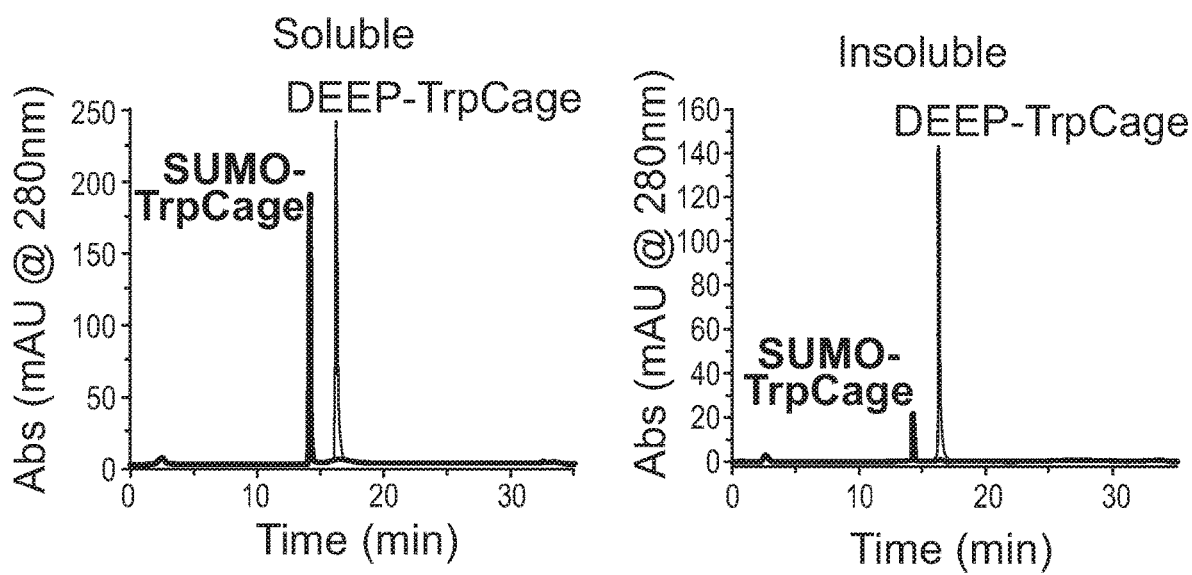

FIGS. 2A-2C relate to overexpression and purification of frGFP (folding reporter GFP), and show that the fusion of DEEP to a well-expressed protein, like GFP, does not impair expression of the protein. Moreover, fusion of DEEP to GFP yielded a protein with higher fluorescence compared to a SUMO-GFP fusion, suggesting that DEEP interferes less than SUMO in the correct folding of GFP.

FIGS. 3A-3D relate to overexpression and purification of Trp cage, and show that overall expression yields of Trp cage are higher for a DEEP fusion than for a SUMO fusion.

Table 1 provides a summary of the purification of His-GFP, DEEP-GFP and SUMO-GFP depicted in FIG. 2B.

TABLE 1

GFP Purification Summary

| | MW (g/mol) | SEC peak (mg/mL) | Fluorescence (RFU) |
|---|---|---|---|
| His-GFP | 28809 | 1.24 | 5450 |
| DEEP-GFP | 39534 | 1.05 | 4029 |
| SUMO-GFP | 41021 | 1.04 | 3874 |

Purification of Insoluble Proteins:

DEEP-$A\beta_{1-42}$, DEEP-INS and DEEP-LS3 were found in the insoluble fraction. The insoluble pellets of DEEP-$A\beta_{1-42}$ or DEEP-INS were washed with lysis buffer supplemented with 1% Triton X-100, centrifuged at 20° C., 30000×g for 20 minutes, and washed two more times with sterile Milli-Q water. Surprisingly, while DEEP-$A\beta_{1-42}$ and DEEP-INS formed inclusion bodies insoluble in 1% TRITON X-100200 detergent, DEEP-LS3 was soluble in this fraction, suggesting preferable association of DEEP-LS3 with the membrane. Hence, TRITON X-100200 detergent wash was omitted and the pellet was washed twice with TBS. Washed pellets of DEEP-$A\beta_{1-42}$, DEEP-INS and DEEP-LS3 were eventually dissolved in TBS containing 6M guanidine HCl and purified using HisTrap column under denaturing conditions with buffers A and B supplemented with 6M guanidine HCl.

Figure 4B:
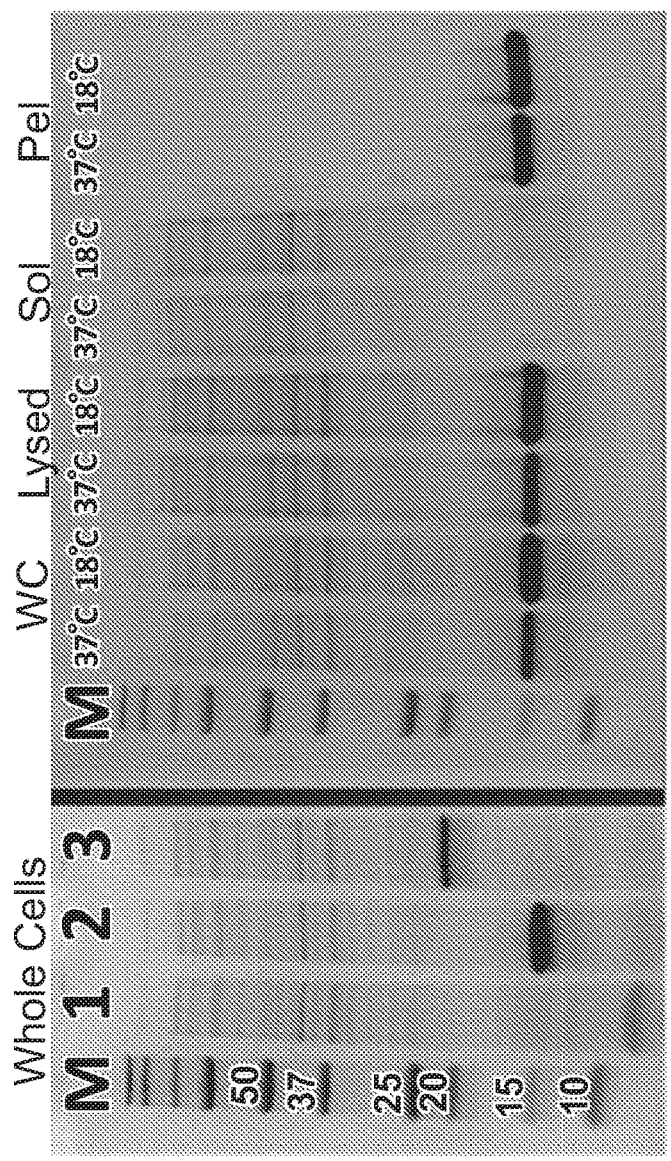
FIGS. 4A-4C relate to overexpression and purification of $A\beta_{1-42}$.
Figure 4A:
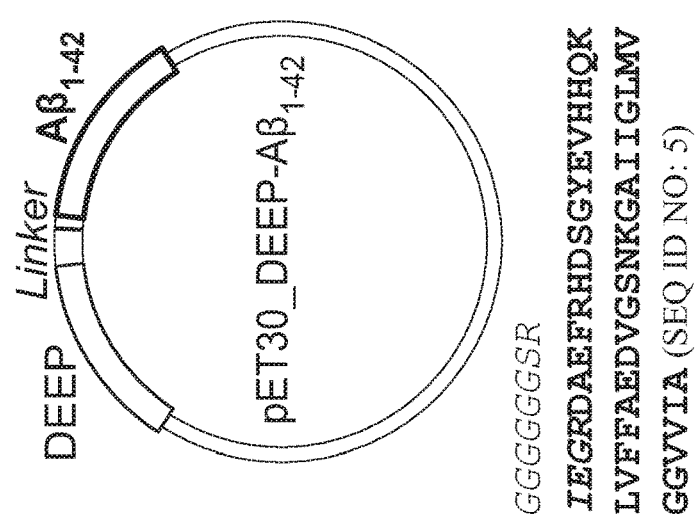
Figure 4C:
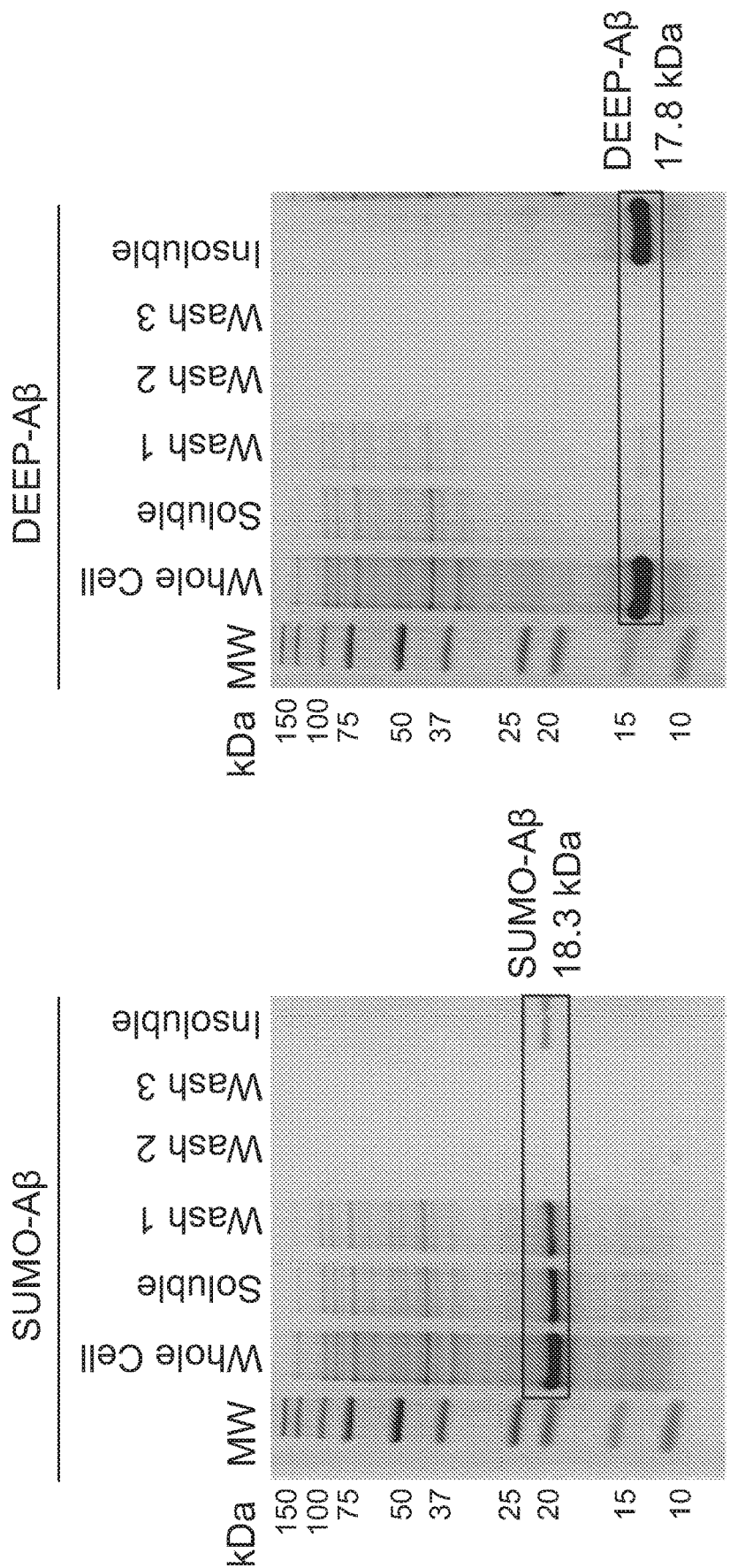

FIGS. 4A-4C relate to overexpression and purification of $A\beta_{1-42}$, and show that, when fused to DEEP, $A\beta_{1-42}$ accumulates primarily in the insoluble fraction, resulting in higher expression yields when compared to a SUMO fusion.

Figures 5A, 5B:
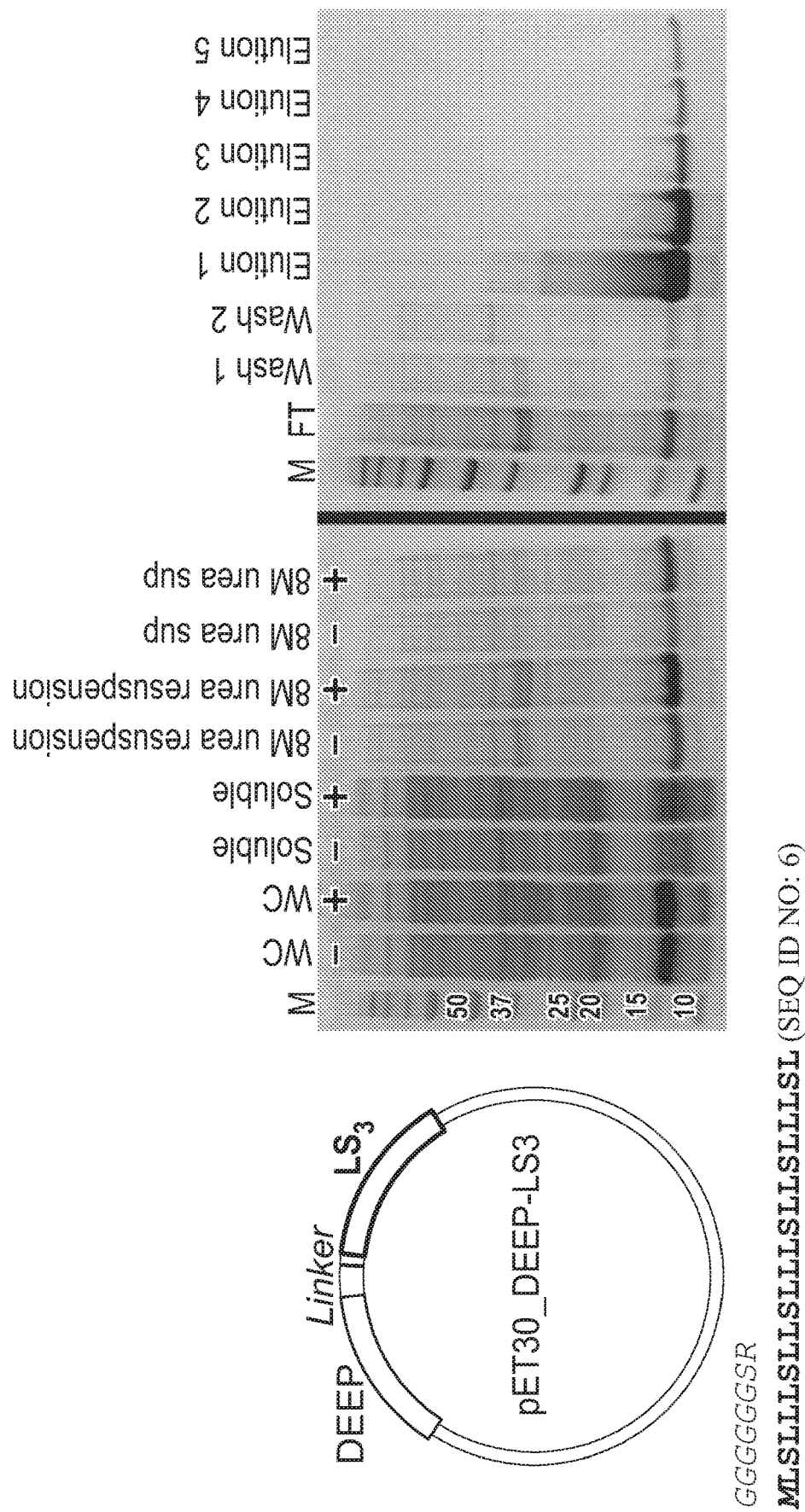
FIGS. 5A-5C relate to overexpression and purification of DEEP-Met-LS3.
Figure 5C:
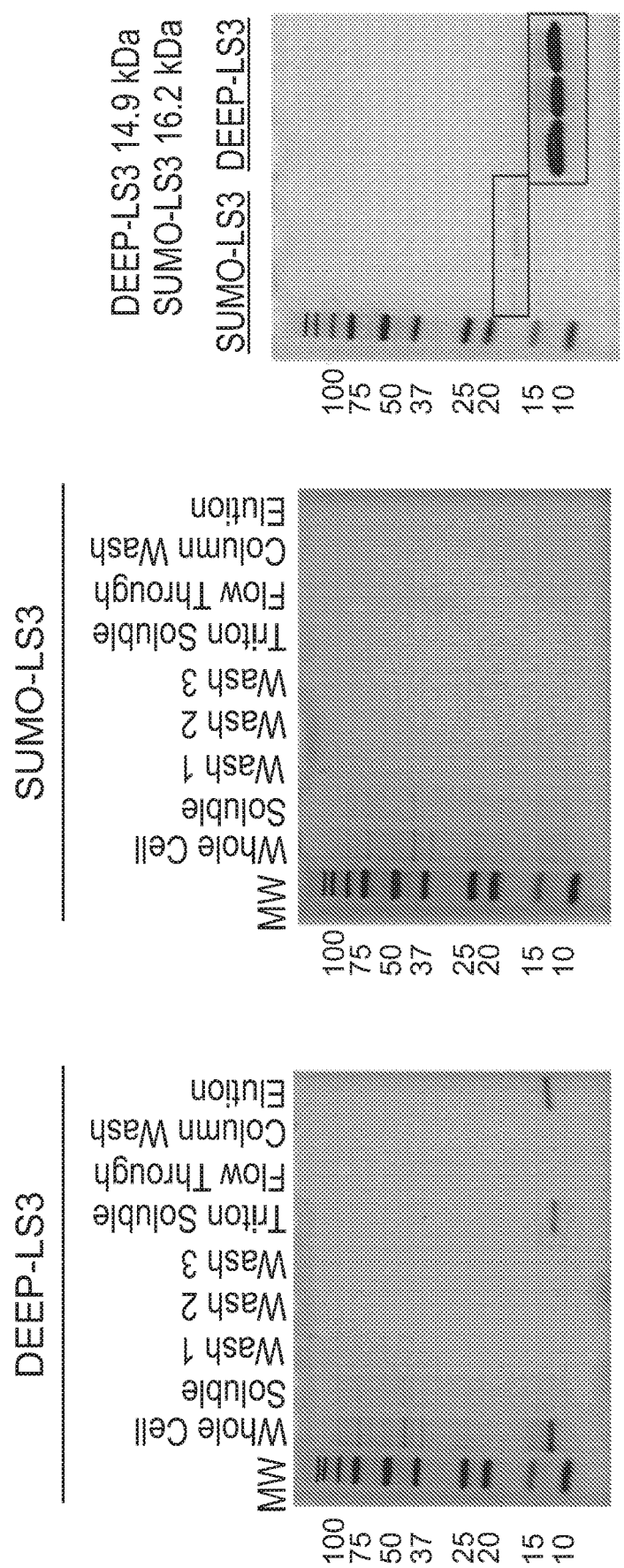

FIGS. 5A-5C relate to overexpression and purification of DEEP-Met-LS3, and show that with DEEP fusion, a protein band corresponding to the correct mass could be seen on the SDS-PAGE gel. On the other hand, almost no protein was observed with SUMO fusion.

FIGS. 6A-6D relate to overexpression of DEEP-Met-Ins, and show that fusion of A and B chains of insulin to both C- and N-termini of DEEP results in high expression yields. Furthermore, DEEP facilitates the refolding process of insulin towards the formation of the correct disulfide pattern.

HPLC Analysis:

Reverse-phase HPLC was performed using either C4 or C18 columns with solvent A: water and solvent B: acetonitrile, both supplemented with 0.1% TFA. Protein samples were acidified with either 0.1% or 1% TFA before loading onto the column.

DEEP-Insulin Refolding and Disulfides Pattern Characterization 50 mg of IMAC purified DEEP-insulin in 8M urea were diluted 10 times with 50 mM Gly buffer at pH=10.5. To initiate disulfides bond reshuffling, βMe was added and the refolding solution was incubated at 4° C. with gentle agitation. To liberate the insulin from DEEP fusion, refolded DEEP-insulin was treated with trypsin and carboxypeptidase B. Cleaved insulin was further purified on the RP-HPLC using C18 column, lyophilized and digested with V8 protease.

Figure 6B:
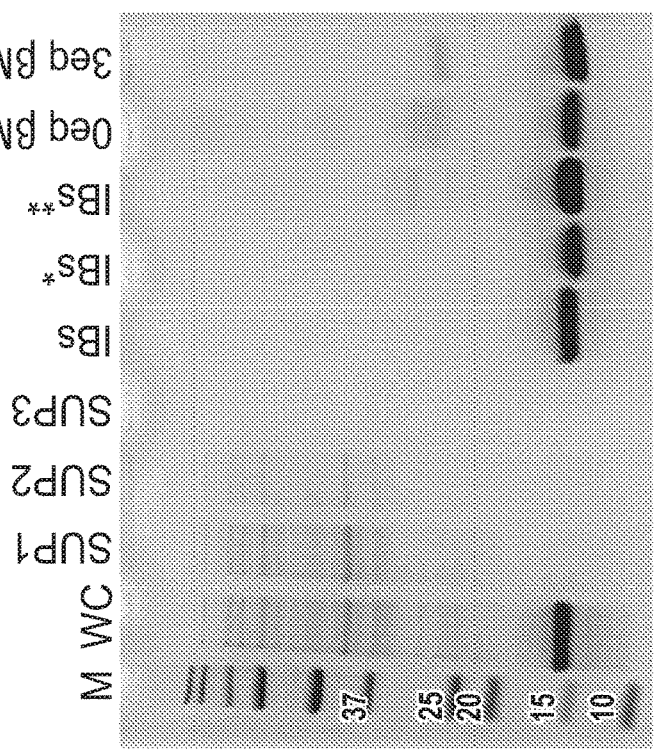
FIGS. 6A-6D relate to overexpression of DEEP-Met-Ins.
Figure 6A:
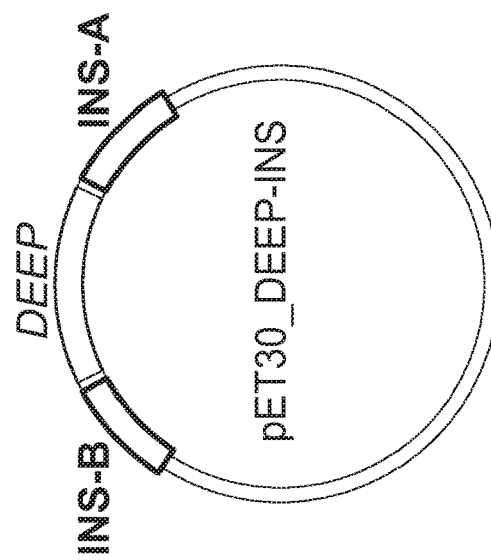
Figure 6C:
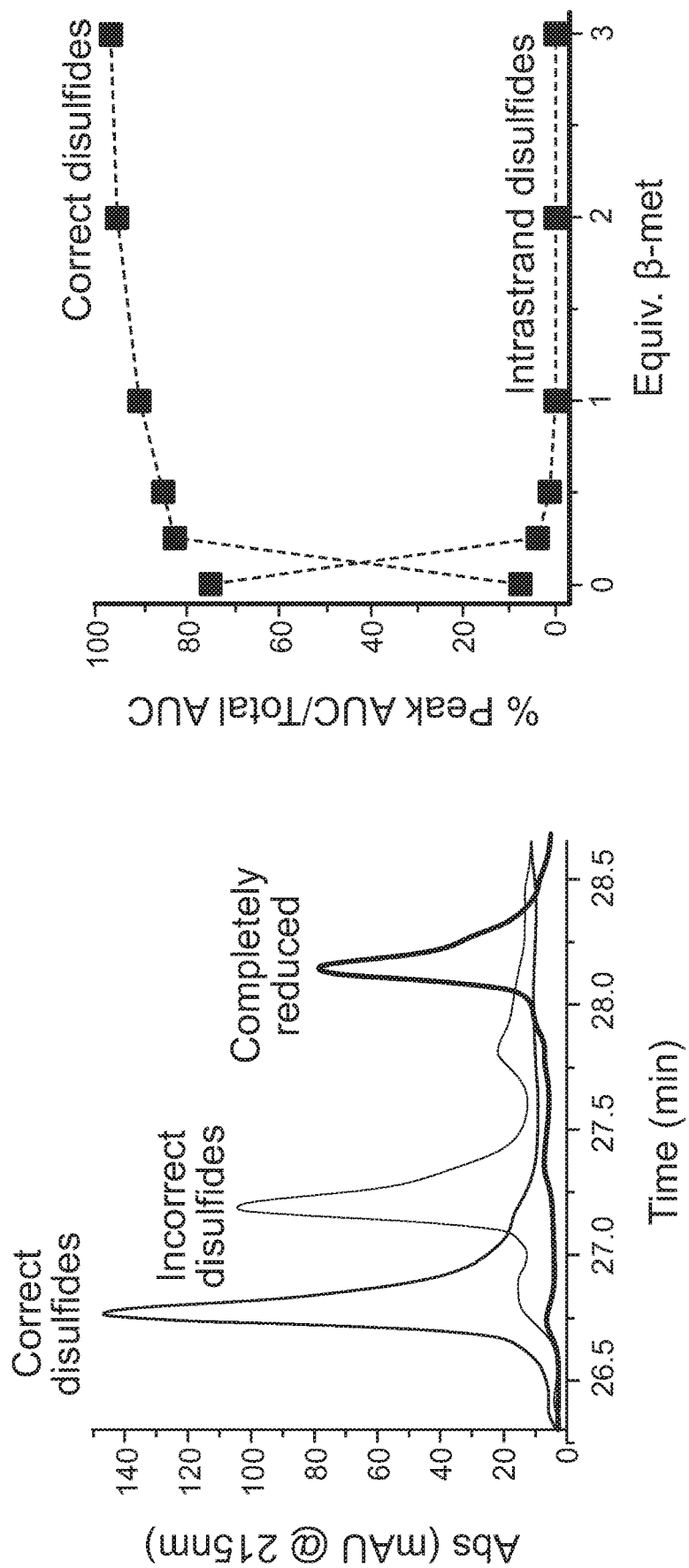
Figure 6D:
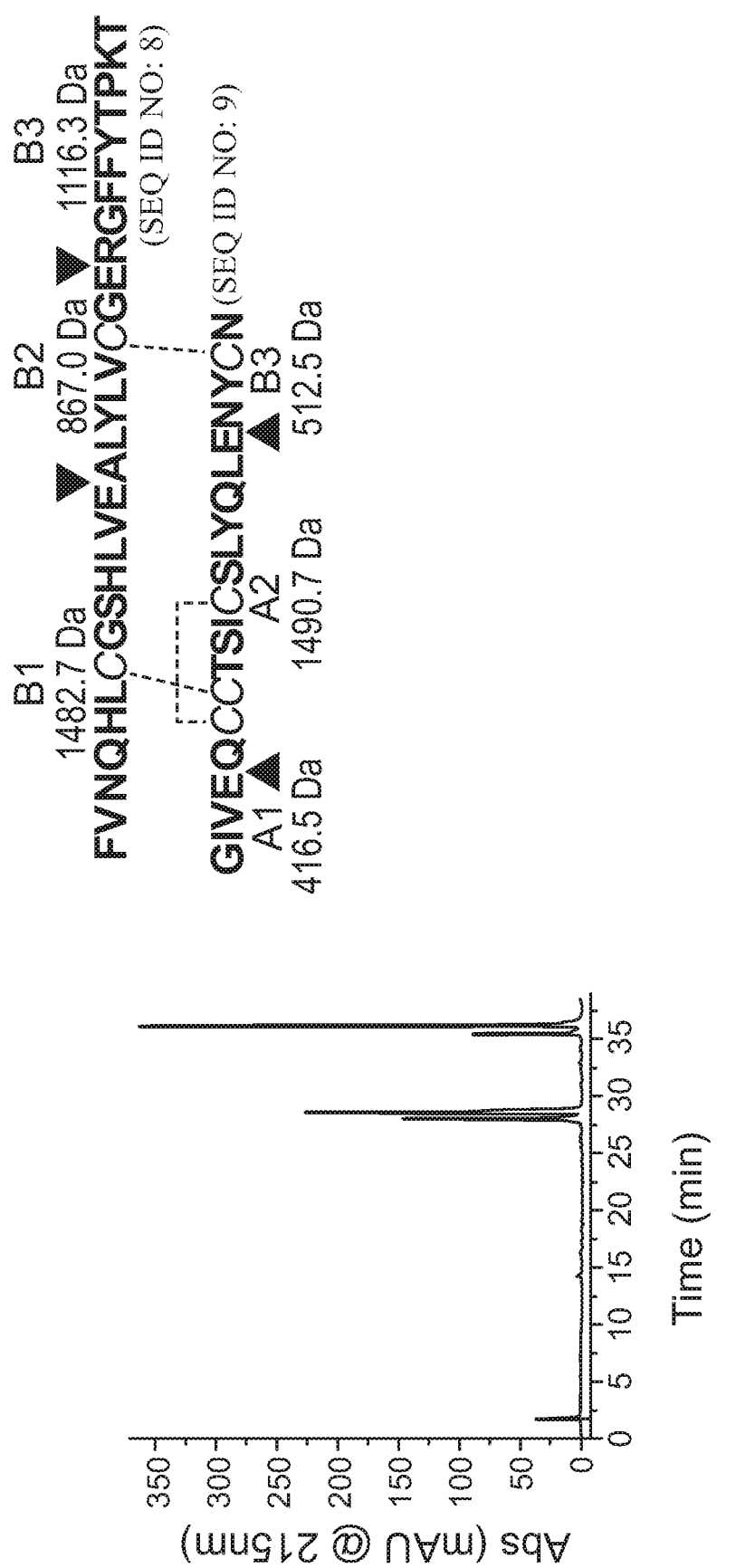

Table 2 shows the calculated and identified masses of peptide fragments of DEEP-insulin digested with V8 protease. The results depicted in Table 2 confirm that the A and B chains of a DEEP-insulin fusion form the disulfide pattern observed in natural insulin. Cleavage sites of V8 and potential disulfide bonds formed between the A and B chains of insulin in the DEEP-insulin fusion protein are depicted in FIG. 6D.

TABLE 2

| Retention Time (minutes) | Peptide | Calculated Mass (Da) | Identified Mass (Da) |
| --- | --- | --- | --- |
| 14.3 | A1 | 416.5 | 416.2 |
| 28 | B3 | 1116.3 | 1115.6 |
| 28.5 | B2 + A3 | 1377.6 | 1376.6 |
| 35.5 | B1 + A2 | 2969.4 | 2968.3 |
| 36.2 | B1 + A1A2 | 3367.9 | 3367.5 |

Unless defined otherwise, all technical and scientific terms used herein have the same meaning as commonly understood by one of ordinary skill in the art to which this invention pertains.

As used herein, the indefinite articles "a" and "an" should be understood to mean "at least one" unless clearly indicated to the contrary.

The phrase "and/or", as used herein, should be understood to mean "either or both" of the elements so conjoined, i.e., elements that are conjunctively present in some cases and disjunctively present in other cases.

It should also be understood that, unless clearly indicated to the contrary, in any methods described herein that include more than one step or act, the order of the steps or acts of the method is not necessarily limited to the order in which the steps or acts of the method are recited.

Unless otherwise indicated or otherwise evident from the context and understanding of one of ordinary skill in the art, values that are expressed as ranges can assume any specific value or subrange within the stated ranges in various embodiments, unless the context clearly dictates otherwise. "About" in reference to a numerical value generally refers to a range of values that fall within ±8%, in some embodiments ±6%, in some embodiments ±4%, in some embodiments ±2%, in some embodiments ±1%, in some embodiments ±0.5% of the value unless otherwise stated or otherwise evident from the context.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

---

What is claimed is:

1. A fusion protein, comprising the amino acid sequence: MRFVNQHLCGSHLVEALYLVCGERGFFYTPKTR-RYGHLNDLLEDLQEVLHNLH HNWHGGHDNLHDVDNHLQNVIE-DIHDFMQGGGSGGHLQEMMHEFQQVLDEL NNHLQGGHHTVHHIEQNIHEIFHHLEELVHRKR-GIVEQCCTSICSLYQLENYCN (SEQ ID NO: 14), wherein the fusion protein
binds to immobilized transition metals.

2. An isolated polypeptide comprising the amino acid sequence of SEQ ID NO: 10, or a variant thereof comprising an amino acid sequence having at least 95% sequence identity to the entire amino acid sequence of SEQ ID NO: 10, wherein the variant thereof comprises at least four α-helices, and wherein the polypeptide or variant thereof binds to immobilized transition metals.

3. The polypeptide of claim 2, comprising the amino acid sequence of SEQ ID NO: 10.

4. The polypeptide of claim 2, wherein the polypeptide is a fusion protein comprising the amino acid sequence of SEQ ID NO: 10 and a heterologous polypeptide.

5. The fusion protein of claim 1, wherein the fusion protein consists of SEQ ID NO: 14.

* * * * *

SEQUENCE LISTING

```
<160> NUMBER OF SEQ ID NOS: 20

<210> SEQ ID NO 1
<211> LENGTH: 102
<212> TYPE: PRT
<213> ORGANISM: Artificial Sequence
<220> FEATURE:
<223> OTHER INFORMATION: S-824 DEEP fusion tag

<400> SEQUENCE: 1

Met Tyr Gly Lys Leu Asn Asp Leu Leu Glu Asp Leu Gln Glu Val Leu
1               5                   10                  15

Lys Asn Leu His Lys Asn Trp His Gly Gly Lys Asp Asn Leu His Asp
            20                  25                  30

Val Asp Asn His Leu Gln Asn Val Ile Glu Asp Ile His Asp Phe Met
        35                  40                  45
```

```
Gln Gly Gly Ser Gly Gly Lys Leu Gln Glu Met Met Lys Glu Phe
    50              55                  60

Gln Gln Val Leu Asp Glu Leu Asn Asn His Leu Gln Gly Gly Lys His
65                  70                  75                  80

Thr Val His His Ile Glu Gln Asn Ile Lys Glu Ile Phe His His Leu
                85                  90                  95

Glu Glu Leu Val His Arg
            100
```

```
<210> SEQ ID NO 2
<211> LENGTH: 8
<212> TYPE: PRT
<213> ORGANISM: Artificial Sequence
<220> FEATURE:
<223> OTHER INFORMATION: FLAG octapeptide

<400> SEQUENCE: 2

Asp Tyr Lys Asp Asp Asp Asp Lys
1               5
```

```
<210> SEQ ID NO 3
<211> LENGTH: 249
<212> TYPE: PRT
<213> ORGANISM: Artificial Sequence
<220> FEATURE:
<223> OTHER INFORMATION: DEEP-GFP

<400> SEQUENCE: 3

Gly Ser Ala Gly Ser Ala Ala Gly Ser Gly Glu Phe Ser Lys Gly Glu
1               5                   10                  15

Glu Leu Phe Thr Gly Val Val Pro Ile Leu Val Glu Leu Asp Gly Asp
                20                  25                  30

Val Asn Gly His Lys Phe Ser Val Ser Gly Glu Gly Gly Gly Asp Ala
            35                  40                  45

Thr Tyr Gly Lys Leu Thr Leu Lys Phe Ile Cys Thr Thr Gly Lys Leu
    50                  55                  60

Pro Val Pro Trp Pro Thr Leu Val Thr Thr Leu Thr Tyr Gly Val Gln
65                  70                  75                  80

Cys Phe Ser Arg Tyr Pro Asp His Met Lys Arg His Asp Phe Phe Lys
                85                  90                  95

Ser Ala Met Pro Glu Gly Tyr Val Gln Glu Arg Thr Ile Ser Phe Lys
                100                 105                 110

Asp Asp Gly Asn Tyr Lys Thr Arg Ala Glu Val Lys Phe Glu Gly Asp
            115                 120                 125

Thr Leu Val Asn Arg Ile Glu Leu Lys Gly Ile Asp Phe Lys Glu Asp
    130                 135                 140

Gly Asn Ile Leu Gly His Lys Leu Glu Tyr Asn Tyr Asn Ser His Asn
145                 150                 155                 160

Val Tyr Ile Thr Ala Asp Lys Gln Lys Asn Gly Ile Lys Ala Asn Phe
                165                 170                 175

Lys Ile Arg His Asn Ile Glu Asp Gly Ser Val Gln Leu Ala Asp His
                180                 185                 190

Tyr Gln Gln Asn Thr Pro Ile Gly Asp Gly Pro Val Leu Leu Pro Asp
            195                 200                 205

Asn His Tyr Leu Ser Thr Gln Ser Ala Leu Ser Lys Asp Pro Asn Glu
    210                 215                 220

Lys Arg Asp His Met Val Leu Leu Glu Phe Val Thr Ala Ala Gly Ile
225                 230                 235                 240
```

Thr His Gly Met Asp Glu Leu Tyr Lys
                245

<210> SEQ ID NO 4
<211> LENGTH: 29
<212> TYPE: PRT
<213> ORGANISM: Artificial Sequence
<220> FEATURE:
<223> OTHER INFORMATION: DEEP-TRP

<400> SEQUENCE: 4

Gly Gly Gly Gly Gly Gly Ser Arg Met Asn Leu Tyr Ile Gln Trp Leu
1               5                   10                  15

Lys Asp Gly Gly Pro Ser Ser Gly Arg Pro Pro Pro Ser
                20                  25

<210> SEQ ID NO 5
<211> LENGTH: 54
<212> TYPE: PRT
<213> ORGANISM: Artificial Sequence
<220> FEATURE:
<223> OTHER INFORMATION: DEEP-amyloid beta.sub.1-42

<400> SEQUENCE: 5

Gly Gly Gly Gly Gly Gly Ser Arg Ile Glu Gly Arg Asp Ala Glu Phe
1               5                   10                  15

Arg His Asp Ser Gly Tyr Glu Val His His Gln Lys Leu Val Phe Phe
                20                  25                  30

Ala Glu Asp Val Gly Ser Asn Lys Gly Ala Ile Ile Gly Leu Met Val
        35                  40                  45

Gly Gly Val Val Ile Ala
    50

<210> SEQ ID NO 6
<211> LENGTH: 30
<212> TYPE: PRT
<213> ORGANISM: Artificial Sequence
<220> FEATURE:
<223> OTHER INFORMATION: DEEP-LS3

<400> SEQUENCE: 6

Gly Gly Gly Gly Gly Gly Ser Arg Met Leu Ser Leu Leu Ser Leu
1               5                   10                  15

Leu Ser Leu Leu Leu Ser Leu Leu Ser Leu Leu Leu Ser Leu
                20                  25                  30

<210> SEQ ID NO 7
<211> LENGTH: 158
<212> TYPE: PRT
<213> ORGANISM: Artificial Sequence
<220> FEATURE:
<223> OTHER INFORMATION: DEEP-INSULIN

<400> SEQUENCE: 7

Met Lys Phe Val Asn Gln His Leu Cys Gly Ser His Leu Val Glu Ala
1               5                   10                  15

Leu Tyr Leu Val Cys Gly Glu Arg Gly Phe Phe Tyr Thr Pro Lys Thr
                20                  25                  30

Arg Arg Tyr Gly Lys Leu Asn Asp Leu Leu Glu Asp Leu Gln Glu Val
        35                  40                  45

Leu Lys Asn Leu His Lys Asn Trp His Gly Gly Lys Asp Asn Leu His
    50                  55                  60

-continued

Asp Val Asp Asn His Leu Gln Asn Val Ile Glu Asp Ile His Asp Phe
65                  70                  75                  80

Met Gln Gly Gly Gly Ser Gly Gly Lys Leu Gln Glu Met Met Lys Glu
                85                  90                  95

Phe Gln Gln Val Leu Asp Glu Leu Asn Asn His Leu Gln Gly Gly Lys
            100                 105                 110

His Thr Val His His Ile Glu Gln Asn Ile Lys Glu Ile Phe His His
        115                 120                 125

Leu Glu Glu Leu Val His Arg Lys Arg Gly Ile Val Glu Gln Cys Cys
    130                 135                 140

Thr Ser Ile Cys Ser Leu Tyr Gln Leu Glu Asn Tyr Cys Asn
145                 150                 155

<210> SEQ ID NO 8
<211> LENGTH: 30
<212> TYPE: PRT
<213> ORGANISM: Homo sapiens

<400> SEQUENCE: 8

Phe Val Asn Gln His Leu Cys Gly Ser His Leu Val Glu Ala Leu Tyr
1               5                   10                  15

Leu Val Cys Gly Glu Arg Gly Phe Phe Tyr Thr Pro Lys Thr
            20                  25                  30

<210> SEQ ID NO 9
<211> LENGTH: 21
<212> TYPE: PRT
<213> ORGANISM: Homo sapiens

<400> SEQUENCE: 9

Gly Ile Val Glu Gln Cys Cys Thr Ser Ile Cys Ser Leu Tyr Gln Leu
1               5                   10                  15

Glu Asn Tyr Cys Asn
            20

<210> SEQ ID NO 10
<211> LENGTH: 101
<212> TYPE: PRT
<213> ORGANISM: Artificial Sequence
<220> FEATURE:
<223> OTHER INFORMATION: S-824 DEEPhislys

<400> SEQUENCE: 10

Tyr Gly His Leu Asn Asp Leu Leu Glu Asp Leu Gln Glu Val Leu His
1               5                   10                  15

Asn Leu His His Asn Trp His Gly Gly His Asp Asn Leu His Asp Val
            20                  25                  30

Asp Asn His Leu Gln Asn Val Ile Glu Asp Ile His Asp Phe Met Gln
        35                  40                  45

Gly Gly Gly Ser Gly Gly His Leu Gln Glu Met Met His Glu Phe Gln
    50                  55                  60

Gln Val Leu Asp Glu Leu Asn Asn His Leu Gly Gly His Thr
65                  70                  75                  80

Val His His Ile Glu Gln Asn Ile His Glu Ile Phe His His Leu Glu
                85                  90                  95

Glu Leu Val His Arg
            100

<210> SEQ ID NO 11
<211> LENGTH: 110
<212> TYPE: PRT
<213> ORGANISM: Homo sapiens

<400> SEQUENCE: 11

Met Ala Leu Trp Met Arg Leu Leu Pro Leu Leu Ala Leu Leu Ala Leu
1               5                   10                  15

Trp Gly Pro Asp Pro Ala Ala Ala Phe Val Asn Gln His Leu Cys Gly
            20                  25                  30

Ser His Leu Val Glu Ala Leu Tyr Leu Val Cys Gly Glu Arg Gly Phe
        35                  40                  45

Phe Tyr Thr Pro Lys Thr Arg Arg Glu Ala Glu Asp Leu Gln Val Gly
    50                  55                  60

Gln Val Glu Leu Gly Gly Gly Pro Gly Ala Gly Ser Leu Gln Pro Leu
65                  70                  75                  80

Ala Leu Glu Gly Ser Leu Gln Lys Arg Gly Ile Val Glu Gln Cys Cys
                85                  90                  95

Thr Ser Ile Cys Ser Leu Tyr Gln Leu Glu Asn Tyr Cys Asn
            100                 105                 110

<210> SEQ ID NO 12
<211> LENGTH: 10
<212> TYPE: PRT
<213> ORGANISM: Artificial Sequence
<220> FEATURE:
<223> OTHER INFORMATION: linker

<400> SEQUENCE: 12

Gly Ser Ala Gly Ser Ala Ala Gly Ser Gly
1               5                   10

<210> SEQ ID NO 13
<211> LENGTH: 8
<212> TYPE: PRT
<213> ORGANISM: Artificial Sequence
<220> FEATURE:
<223> OTHER INFORMATION: 6x glycine linker

<400> SEQUENCE: 13

Gly Gly Gly Gly Gly Gly Ser Arg
1               5

<210> SEQ ID NO 14
<211> LENGTH: 158
<212> TYPE: PRT
<213> ORGANISM: Artificial Sequence
<220> FEATURE:
<223> OTHER INFORMATION: insulin A-DEEPhislys-insulin B

<400> SEQUENCE: 14

Met Arg Phe Val Asn Gln His Leu Cys Gly Ser His Leu Val Glu Ala
1               5                   10                  15

Leu Tyr Leu Val Cys Gly Glu Arg Gly Phe Phe Tyr Thr Pro Lys Thr
            20                  25                  30

Arg Arg Tyr Gly His Leu Asn Asp Leu Leu Glu Asp Leu Gln Glu Val
        35                  40                  45

Leu His Asn Leu His His Asn Trp His Gly Gly His Asp Asn Leu His
    50                  55                  60

Asp Val Asp Asn His Leu Gln Asn Val Ile Glu Asp Ile His Asp Phe
65                  70                  75                  80

```
Met Gln Gly Gly Gly Ser Gly Gly His Leu Gln Glu Met Met His Glu
                85                  90                  95

Phe Gln Gln Val Leu Asp Glu Leu Asn Asn His Leu Gly Gly His
            100                 105                 110

His Thr Val His His Ile Glu Gln Asn Ile His Glu Ile Phe His His
        115                 120                 125

Leu Glu Glu Leu Val His Arg Lys Arg Gly Ile Val Glu Gln Cys Cys
130                 135                 140

Thr Ser Ile Cys Ser Leu Tyr Gln Leu Glu Asn Tyr Cys Asn
145                 150                 155

<210> SEQ ID NO 15
<211> LENGTH: 7
<212> TYPE: PRT
<213> ORGANISM: Artificial Sequence
<220> FEATURE:
<223> OTHER INFORMATION: heptad sequence of DEEP polypeptide
<220> FEATURE:
<221> NAME/KEY: MISC_FEATURE
<222> LOCATION: (1)..(1)
<223> OTHER INFORMATION: Xaa is independently selected from the polar
      amino acid residues Lys (K), His (H), Glu (E), Gln (Q), Asp (D),
      Asn (N), Thr (T) and Ser (S)
<220> FEATURE:
<221> NAME/KEY: MISC_FEATURE
<222> LOCATION: (2)..(2)
<223> OTHER INFORMATION: Xaa is independently selected from the nonpolar
      amino acid residues Phe (F), Leu (L), Ile (I), Met (M), Val (V)
      and Trp (W)
<220> FEATURE:
<221> NAME/KEY: MISC_FEATURE
<222> LOCATION: (3)..(4)
<223> OTHER INFORMATION: Xaa is independently selected from the polar
      amino acid residues Lys (K), His (H), Glu (E), Gln (Q), Asp (D),
      Asn (N), Thr (T) and Ser (S)
<220> FEATURE:
<221> NAME/KEY: MISC_FEATURE
<222> LOCATION: (5)..(6)
<223> OTHER INFORMATION: Xaa is independently selected from the nonpolar
      amino acid residues Phe (F), Leu (L), Ile (I), Met (M), Val (V)
      and Trp (W)
<220> FEATURE:
<221> NAME/KEY: MISC_FEATURE
<222> LOCATION: (7)..(7)
<223> OTHER INFORMATION: Xaa is independently selected from the polar
      amino acid residues Lys (K), His (H), Glu (E), Gln (Q), Asp (D),
      Asn (N), Thr (T) and Ser (S)

<400> SEQUENCE: 15

Xaa Xaa Xaa Xaa Xaa Xaa Xaa
1               5

<210> SEQ ID NO 16
<211> LENGTH: 5
<212> TYPE: PRT
<213> ORGANISM: Artificial Sequence
<220> FEATURE:
<223> OTHER INFORMATION: sequence providing enteropeptidase cleavage
      site

<400> SEQUENCE: 16

Asp Asp Asp Asp Lys
1               5

<210> SEQ ID NO 17
<211> LENGTH: 7
<212> TYPE: PRT
<213> ORGANISM: Artificial Sequence
<220> FEATURE:
<223> OTHER INFORMATION: sequence providing tobacco etch virus protease
```

```
                        cleavage site

<400> SEQUENCE: 17

Glu Asn Leu Tyr Phe Gln Gly
1               5

<210> SEQ ID NO 18
<211> LENGTH: 4
<212> TYPE: PRT
<213> ORGANISM: Artificial Sequence
<220> FEATURE:
<223> OTHER INFORMATION: sequence providing factor Xa cleavage site

<400> SEQUENCE: 18

Ile Glu Gly Arg
1

<210> SEQ ID NO 19
<211> LENGTH: 6
<212> TYPE: PRT
<213> ORGANISM: Artificial Sequence
<220> FEATURE:
<223> OTHER INFORMATION: sequence providing thrombin cleavage site

<400> SEQUENCE: 19

Leu Val Pro Arg Gly Ser
1               5

<210> SEQ ID NO 20
<211> LENGTH: 7
<212> TYPE: PRT
<213> ORGANISM: Artificial Sequence
<220> FEATURE:
<223> OTHER INFORMATION: subunit of LS3 polypeptide

<400> SEQUENCE: 20

Leu Ser Leu Leu Leu Ser Leu
1               5
```